United States Patent [19]

Inoue et al.

[11] Patent Number: 5,583,401
[45] Date of Patent: Dec. 10, 1996

[54] BEAM LANDING CORRECTION APPARATUS FOR A CATHODE RAY TUBE

[75] Inventors: Ikunori Inoue, Takatsuki; Susumu Tsujihara, Neyagawa; Kazushige Kida, Settsu, all of Japan

[73] Assignee: Matsushita Electric Industrial Co., Ltd., Osaka, Japan

[21] Appl. No.: 474,519

[22] Filed: Jun. 7, 1995

Related U.S. Application Data

[63] Continuation-in-part of Ser. No. 13,624, Feb. 4, 1993, abandoned.

[30] Foreign Application Priority Data

Feb. 7, 1992 [JP] Japan ..................... 4-022391
Sep. 11, 1992 [JP] Japan ..................... 4-243050

[51] Int. Cl.$^6$ ........................... H01J 29/56
[52] U.S. Cl. ........................... 315/370; 315/8
[58] Field of Search ..................... 315/370, 8, 85; 361/150

[56] References Cited

U.S. PATENT DOCUMENTS

| 3,588,583 | 6/1971 | Ciecierski . | |
|---|---|---|---|
| 4,963,789 | 10/1990 | Buhler | 315/8 |
| 5,066,891 | 11/1991 | Harrold et al. | 315/8 |
| 5,117,155 | 5/1992 | Buhler | 315/8 |
| 5,168,199 | 12/1992 | Huffman et al. | 315/370 |

FOREIGN PATENT DOCUMENTS

| 0077112 | 4/1983 | European Pat. Off. . |
| 0396381 | 11/1990 | European Pat. Off. . |
| 50-128420 | 10/1975 | Japan . |
| 52-40921 | 3/1977 | Japan . |
| 2-29187 | 1/1990 | Japan . |
| 02029187 | 1/1990 | Japan . |

OTHER PUBLICATIONS

English Abstract of Document No. 2–29187 as shown above.
English Abstract of Document No. 52–40921 as shown above.

*Primary Examiner*—Theodore M. Blum
*Attorney, Agent, or Firm*—Ratner & Prestia

[57] ABSTRACT

By providing a plurality of landing correction coil pairs each comprised of a correction coil in the x-axis direction and a correction coil in the y-axis direction at four peripheral corner portions of the cathode ray tube (CRT) and by controlling the direction and magnitude of the resultant vector of the correction magnetic fields generated by the x-axis direction correction coil and the y-axis direction correction coil, the influence of the geomagnetism is canceled to allow a high-accuracy landing correction to be achieved. Furthermore, by detecting the chromaticity and luminance information on the screen to obtain a mislanding quantity and by forming a correction current corresponding to the quantity through the aforementioned correction means to perform an automatic correction to allow a quantitative landing correction to be performed correctly in a short time.

23 Claims, 25 Drawing Sheets

Fig.2(a)
Influence of Geomagnetism
E 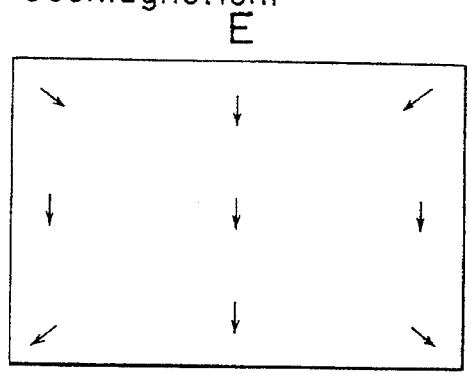 S 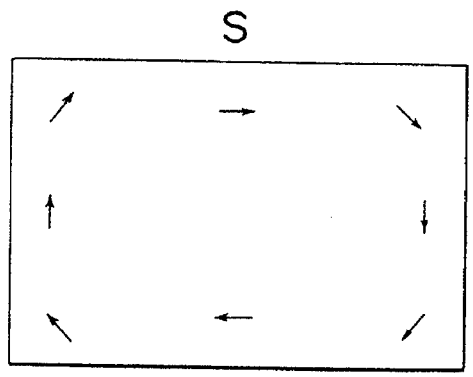
W 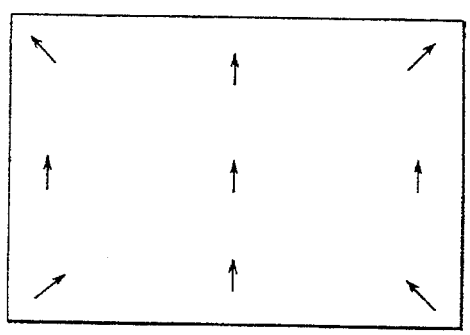 N 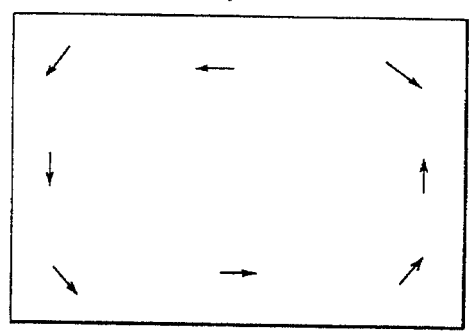
Fig.2(b)
Influence of Vertical Magnetism
Northern Hemisphere 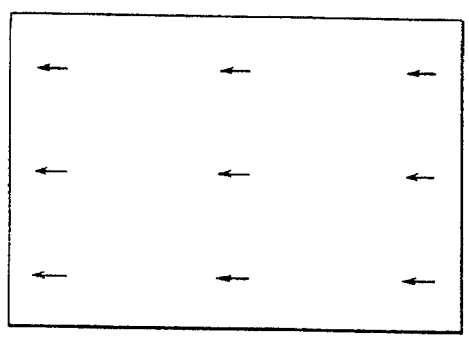 Southern Hemisphere 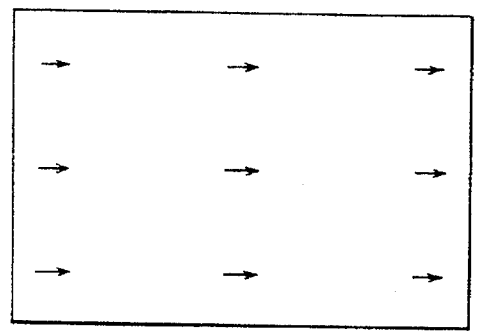

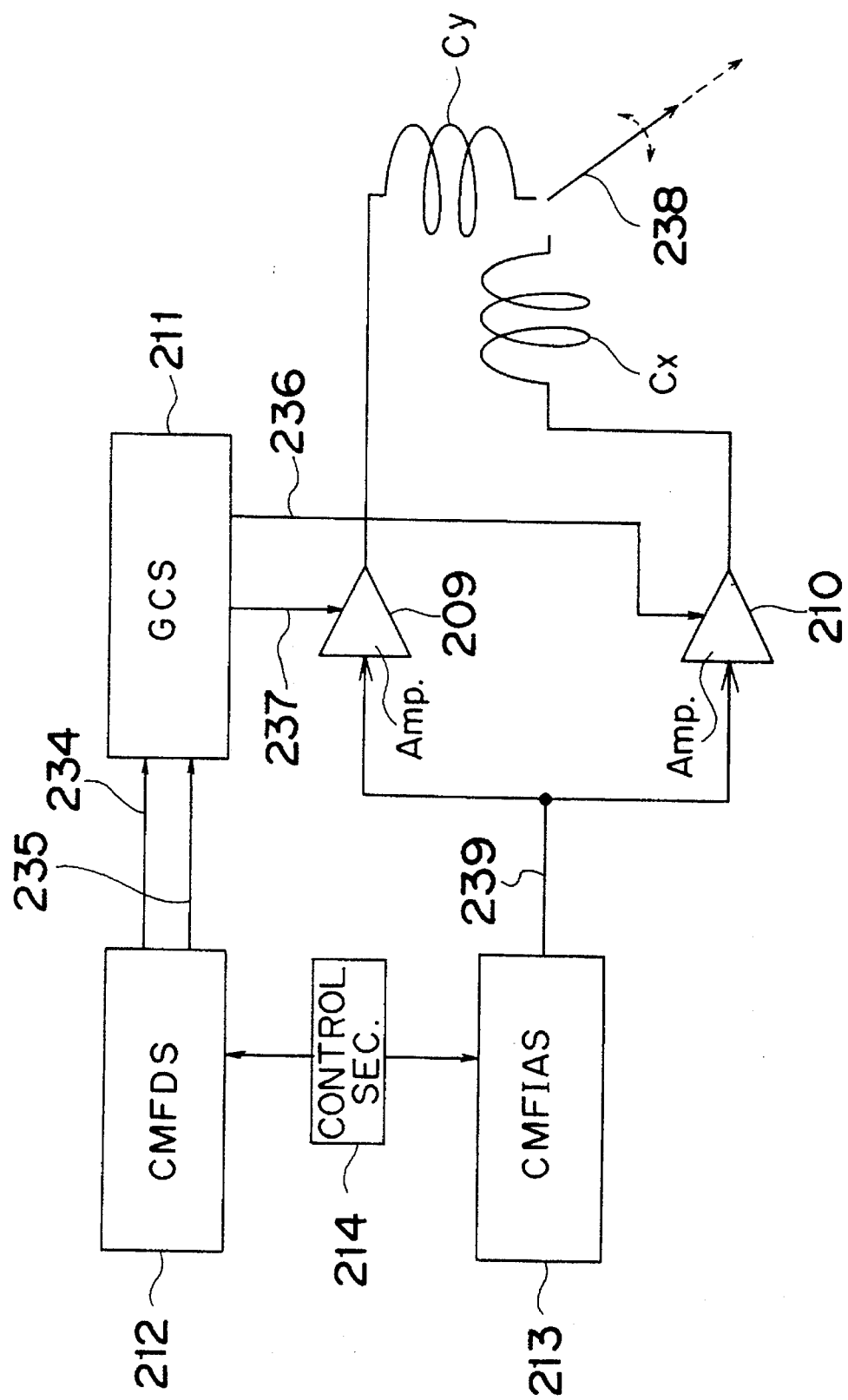

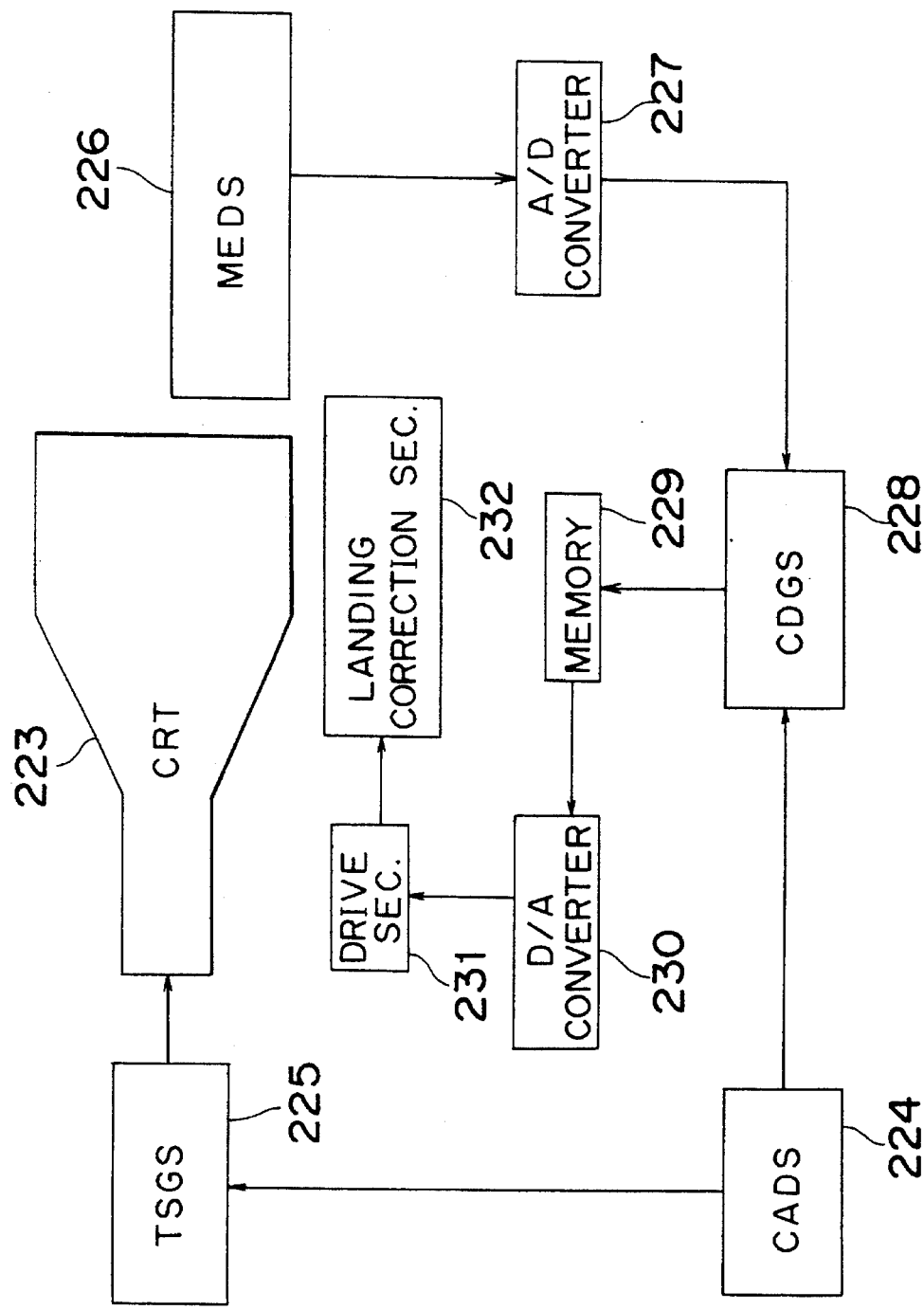

DISPLAY SCREEN

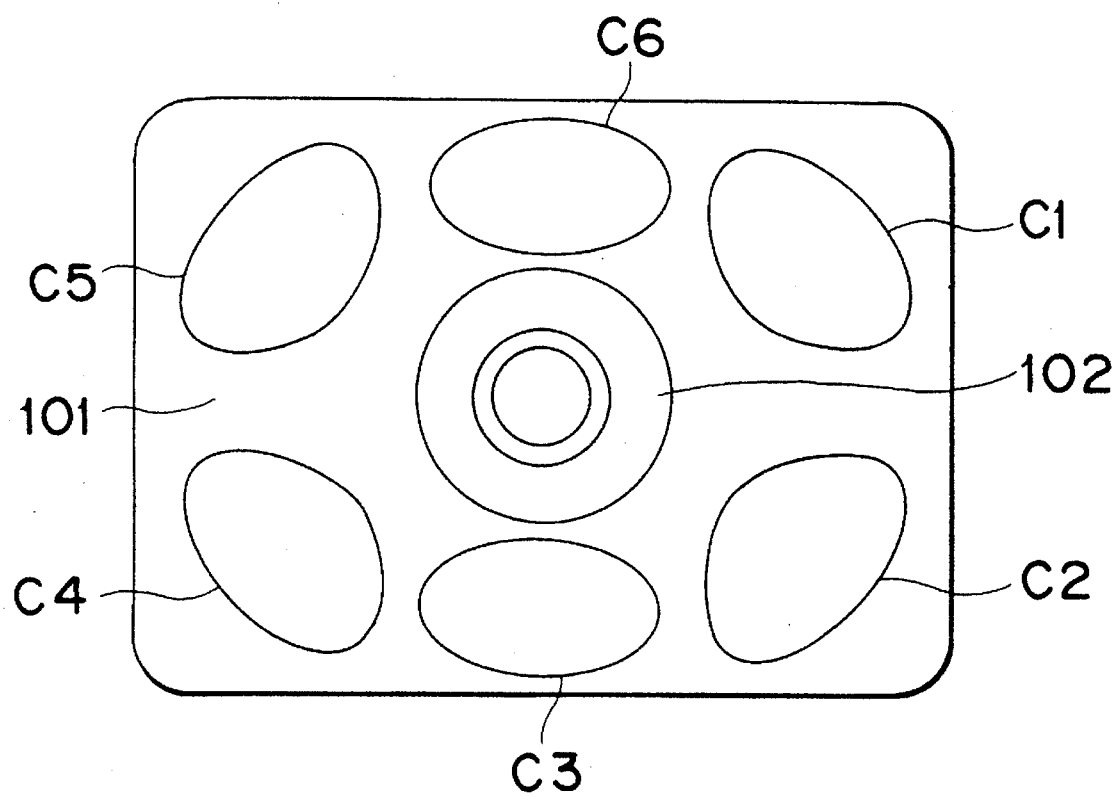

Fig.14
(Prior Art)
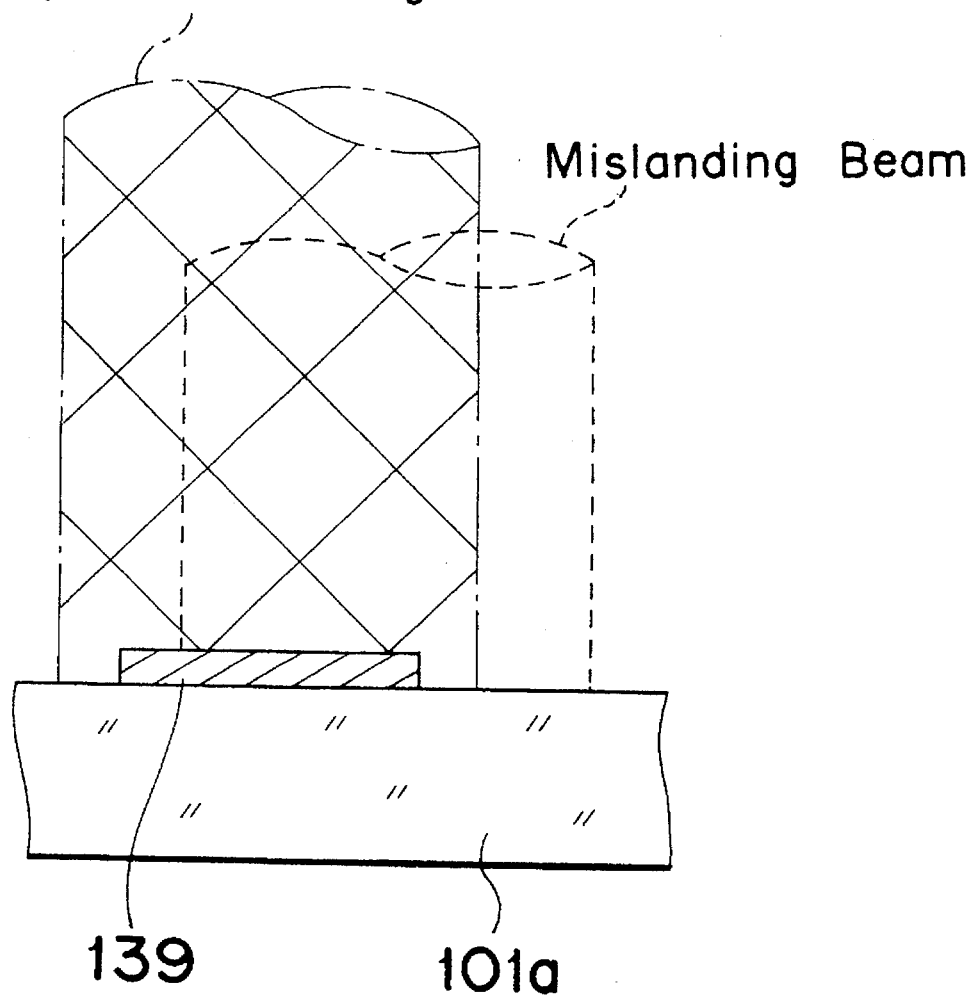
Optimum Landing Beam
Mislanding Beam
139    101a
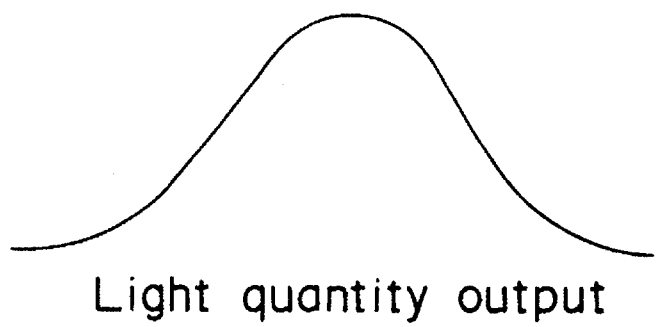
Light quantity output

BEAM LANDING CORRECTION APPARATUS FOR A CATHODE RAY TUBE

This application is a continuation-in-part of application Ser. No. 08/013,624 filed Feb. 4, 1993, abandoned.

BACKGROUND OF THE INVENTION

1. Field of the Invention

The present invention relates to a landing correction apparatus for preventing a possible degradation of chromatic purity caused by an influence of a geomagnetism in a color television receiver.

2. Description of the Prior Art

Generally in a color television receiver in which a display image is formed on a display screen by scanning phosphor elements through deflection of an electron beam, a landing position of an electron beam is varied by an influence of a geomagnetism to result in a change in luminance and chromaticity of the image picture displayed on the display screen. Particularly in a cathode ray tube for use in a high vision system where high density phosphor elements having a fine pitch is adopted, there occurs a greater degree of a landing error of an electron beam (referred to as "mislanding" hereinafter) due to the influence of the geomagnetism.

One such system for beam mislanding correction is shown in Japanese Patent Publication laid open 4-109785 and its corresponding U.S. Pat. No. 5,298,985 entitled IMAGE CORRECTION APPARATUS FOR ADJUSTING IMAGES BY DIGITALLY CONTROLLING ANALOG CORRECTION WAVEFORMS, issued to Tsujihara, which are incorporated herein by reference for their teachings on beam mislanding correction.

The degree of electron beam mislanding depends on the arrangement of the phosphor elements. With regard to the arrangement of the phosphor elements, for instance, when comparing a stripe type arrangement as shown in FIG. 9 (a) with a dot type arrangement as shown in FIG. 9 (b), the stripe type arrangement has a greater tolerance for the beam landing because no substantial change takes place in luminance efficiency of the phosphor element when the beam landing position varies in the lengthwise direction of the stripe phosphor element. In FIGS. 9(a) and 9(b), reference numerals 301 and 302 denote phosphor elements, and reference numerals 303 and 304 depicted by broken lines denote mislanding positions of electron beams.

The mislanding of electron beams is corrected using a landing correction coil through which an appropriate electric current is flowed for canceling the influence of the geomagnetism. As a conventional electron beam landing correction apparatus, there has been employed, for example, a beam landing correction apparatus for a color cathode ray tube as disclosed in the Japanese Patent (Unexamined) Laid-Open Publication No. HEI 2-29187.

The above mentioned conventional landing correction apparatus is briefly explained with reference to FIGS. 10 through 14.

Referring to FIGS. 10 and 12, the apparatus comprises a cathode ray tube (CRT) 101 having a display panel 101a, a deflection yoke 102, periphery landing correction coils C1 through C6 for correcting the mislanding of electron beams in peripheral portions of the screen, photosensors Ps1 through Ps6 for detecting the mislanding, a gun center coil 107 for correcting the mislanding of the electron beams at the center portion of the screen, and a measurement coil 108 for generating an auxiliary deflection magnetic field for measuring the mislanding amount. The apparatus further comprises a sample/hold circuit (S/H) 109 for sampling and holding an output of each photosensor, a multiplexer 110, an analog-to-digital (A/D) converter 111, a digital calculation circuit 112, a measurement control circuit 113, a demultiplexer 114, a latch 115, a digital-to-analog (D/A) converter 116, a drive circuit 117 for driving the landing correction coils, and a video circuit 118 for processing a video signal.

FIG. 11 shows an arrangement of the periphery landing correction coils C1 through C6 for correcting the mislanding of the electron beams at the peripheral portions of the screen.

FIGS. 12 (a) and 12 (b) show an arrangement of photosensors Ps1 through Ps6 for detecting the luminance on the screen. In FIG. 12 (a), the positions of the photosensors Ps1 through Ps6 corresponds to the positions of the landing correction coils C1 through C6 at the peripheral portions of the screen. The photosensors are covered by a frame member 137. A phosphor element 139 is provided on the inner surface of the display panel 101a at the face plate of the cathode ray tube 101.

The following describes the operation of the conventional landing correction apparatus having the above-mentioned construction with reference to FIGS. 13 and 14. FIGS. 13 (a) and 13 (b) are charts for explaining a mislanding detection operation, while FIG. 14 shows a relationship between the beam landing position and the light quantity detected by a photosensor.

First, regarding a measurement current i which is applied to the mislanding amount measurement coil 108 from the measurement control circuit 113, the current i increases in steps from a negative potential region to a positive potential region for measuring the mislanding amount in each field as shown in FIG. 13 (a). In the above case, a control signal e is supplied from the measurement control circuit 113 to the video circuit 118 so that the video circuit 118 provides, for example, a video signal for generating a green or white raster to the cathode 101c of the cathode ray tube 101.

According to change of the current flowing through the measurement coil 108, the deflection center in the deflection yoke position is changed as indicated by the beam loci in FIG. 13 (b). That is, the beam is applied to the position on the screen from a cathode 101c passing through an aperture mask 146 and the beam landing position is moved in the horizontal direction of the screen as indicated by arrows in FIG. 13 (b) (vertical direction in the figure). Reference numeral 143 denotes a center beam when no deflection is applied, and numeral 144 denotes an electron beam deflected by the geomagnetism, and numeral 145 denotes a mislanding-corrected beam deflected by the gun center coil 107.

Light quantity detection outputs of the photosensors Ps1 through Ps6 are sampled every field in the sample/hold circuit 109 as shown in FIG. 13 (a), and the sampled data is transmitted via the multiplexer 110 to the analog-to-digital converter 111 and then supplied to the digital calculation circuit 112 in a form of a digital signal.

The detected light quantity output of the phosphors takes its maximum value at the optimum landing position and gradually decrease as it departs from the optimum landing position as shown in FIG. 14. Since the mislanding amount differs in different portions of the screen, the optimum field number at which the maximum light quantity can be obtained differs in each photosensor.

The digital calculation circuit 112 calculates measurement currents $i_1, i_2, \ldots, i_6$ corresponding to the position of each of the photosensors Ps1 through Ps6 at which the maximum output is obtained. Furthermore, an average or a weighted average of the current values are calculated to obtain a correction current $d_0$ to be applied to the gun center coil 107. The correction current $d_0$ is a direct current which is used for the landing correction in a center area of the screen.

Meanwhile, correction currents $d_1, d_2, \ldots, d_6$ are calculated from the measurement currents $i_1, i_2, \ldots, i_6$. The correction currents $d_1, d_2, \ldots, d_6$ calculated in the calculation circuit 112 are each output via the demultiplexer 114 to the latch circuit 115 and further converted into an analog form by means of the digital-to-analog (D/A) converter 116 to be subsequently supplied via the drive circuit 117 to each of the periphery landing correction coils C1 through C6. The above-mentioned correction currents $d_1, d_2, \ldots, d_6$ are direct currents to be supplied to the correction coils at the peripheral portions of the cathode ray tube to correct the beam mislanding which cannot be removed by the gun center coil 107.

However, in the above-mentioned landing correction coil arrangement as in the conventional example, although the strength of the magnetic field formed by the correction coils can be controlled, the direction of the landing correction magnetic field formed by the correction coils can not be controlled, and therefore the influence of the geomagnetism directed in a variety of directions cannot be canceled, resulting in involving a problem that the beam mislanding cannot be corrected with high accuracy.

Furthermore, the optimum landing position is specified to the point at which the light quantity detected by the photosensor is at its maximum value without taking any matter of chromaticity into consideration, and therefore there also arises another problem that no sufficient uniformity in chromaticity can be achieved in the displayed picture even when a landing correction is effected.

SUMMARY OF THE INVENTION

Accordingly, in view of the above-mentioned problems in the conventional apparatus, the present invention was made to provide a beam landing correction apparatus which is capable of correcting with high accuracy the influence of the geomagnetism which extends irregularly in a cathode ray tube and which has a higher intensity in the peripheral portions of the cathode ray tube thereby to achieve a high-accuracy landing correction by providing a plurality of correction coil pairs each comprised of a correction coil for generating a magnetic field in the x-axis direction (horizontal direction on the cathode ray tube screen) and a correction coil for generating a magnetic field in the y-axis direction (vertical direction on the cathode ray tube screen) at four peripheral corner portions of the cathode ray tube and by controlling the directions and magnitudes of the resultant combined vector of the correction magnetic fields generated by the x-axis correction coil and the y-axis correction coil.

Furthermore, the present invention is intended to provide a beam landing correction apparatus capable of effecting a quantitative landing correction with high accuracy in a short time by detecting chromaticity data and luminance data on the screen to obtain a beam mislanding amount to flow a correction current corresponding to the mislanding amount through the aforementioned correction coil means to achieve an automatic correction operation.

Therefore, an essential objective of the present invention is to provide a beam landing correction apparatus capable of canceling the influence of the geomagnetism extending in an arbitrary direction by providing a plurality of landing correction coil pairs each comprised of a correction coil for generating a magnetic field in the x-axis direction (horizontal direction on the cathode ray tube screen) and a correction coil for generating a magnetic field in the y-axis direction (vertical direction on the cathode ray tube screen) as landing correction coil means and by controlling the direction and intensity of the correction magnetic field.

Another objective of the present invention is to provide a beam landing correction apparatus capable of uniformizing the chromaticity and luminance on the screen by detecting the chromaticity data as well as luminance data of a display image of a video signal on the display screen, obtaining a mislanding amount according to the detected chromaticity and luminance data, and supplying a correction current corresponding to the mislanding amount to the aforementioned landing correction coils to effect an automatic landing correction.

In order to achieve the above-mentioned objectives, according to a first feature of the present invention, the apparatus is provided with a plurality of landing correction coil pairs each of which coil pair is comprised of two correction coils which generate magnetic fields having magnetic field axes crossing each other at right angles in such a manner that the direction of the magnetic field generated by one of the two coils coincide with the horizontal direction on the screen of the cathode ray tube while the direction of the magnetic field generated by the other coil coincide with the vertical direction on the screen of the cathode ray tube, and control means for controlling the direction and magnitude of the correction magnetic field generated by the landing correction coil pairs to achieve a high-accuracy landing correction, allowing to cancel the influence of the geomagnetism extending in an arbitrary direction.

According to a second feature of the present invention, the apparatus is provided with mislanding amount measuring means for obtaining a mislanding amount based on the luminance and chromaticity distribution in the two-dimensional area of an image picture displayed on the screen of the cathode ray tube and means for supplying correction data to the landing correction means based on the mislanding amount, thereby allowing to automatically uniformize the chromaticity and luminance on the screen.

According to a third feature of the present invention, the apparatus is provided with correction magnetic field direction setting means for adjusting the direction of the correction magnetic field generated by landing correction means having a plurality of coil pairs each comprised of a pair of two correction coils which generate magnetic fields for correction having their axes crossing each other at right angles, and correction magnetic field intensity adjustment means for adjusting the intensity of the correction magnetic field without substantially exerting any influence on the correction magnetic field direction to thereby obtain an optimum correction magnetic field by way of algorism, allowing to independently control the directions and intensities of the correction magnetic field generated by the landing correction coils.

According to a fourth feature of the present invention, the apparatus is provided with correction area designation means for designating an area to be subjected to a landing correction; test signal generating means for displaying a test signal in the area to be corrected on the display means according to an output of the correction area designation means; landing error detection means for detecting the beam mislanding in the area to be corrected; and correction magnetic field data generating means for supplying correction magnetic field data to the landing correction means corresponding to the area to be corrected which is designated by the correction area designation means according to the landing error data detected by the landing error detection means, thereby allowing to automatically perform a landing correction.

BRIEF DESCRIPTION OF THE DRAWINGS

These and other objects and features of the present invention will become apparent from the following description taken in conjunction with the preferred embodiments thereof with reference to the accompanying drawings, in which:

FIG. 1 (b) is a schematic view showing an arrangement of landing correction coils of the first embodiment;

FIG. 3 (b) is a schematic view showing an arrangement of landing correction coils of FIG. 3 (a);

FIG. 4 (b) is a schematic view showing an arrangement of landing correction coils of the second embodiment;

FIG. 5 is a block diagram of a beam landing correction apparatus in accordance with a third embodiment of the present invention;

FIG. 8 (b) is a schematic view showing an arrangement of landing correction coils of the fourth embodiment;

FIG. 11 is a schematic view showing an arrangement of landing correction coils of the conventional apparatus;

FIG. 14 is an explanatory view showing a relationship between the light quantity and the beam landing positions in the conventional apparatus.

DETAILED DESCRIPTION OF THE PREFERRED EMBODIMENTS

Embodiment 1

Figure 1A:
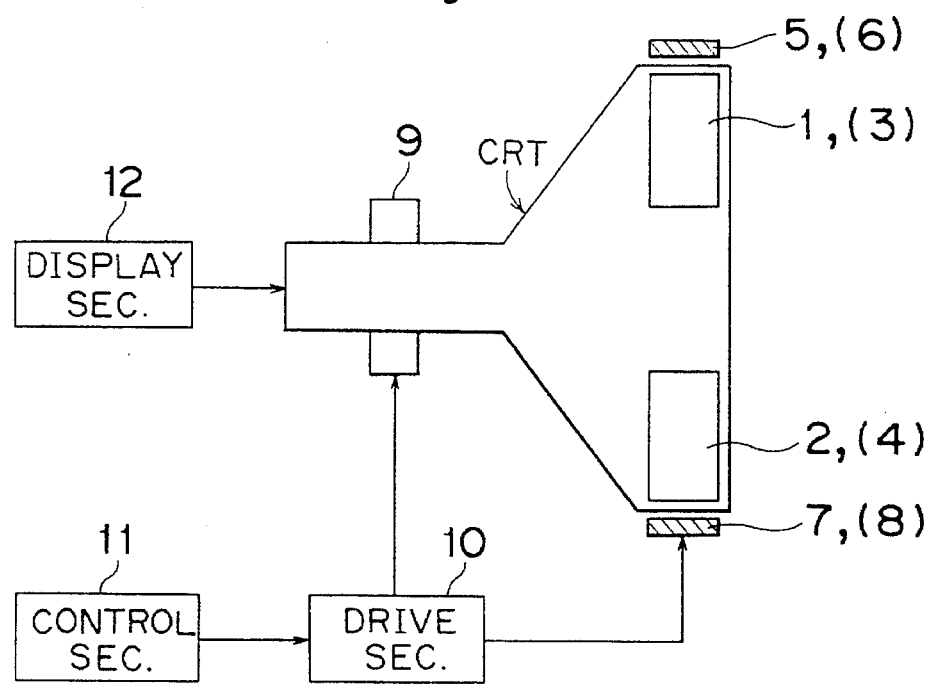
FIG. 1 (a) is a block diagram of a beam landing correction apparatus in accordance with a first embodiment of the present invention.
Figure 1B:
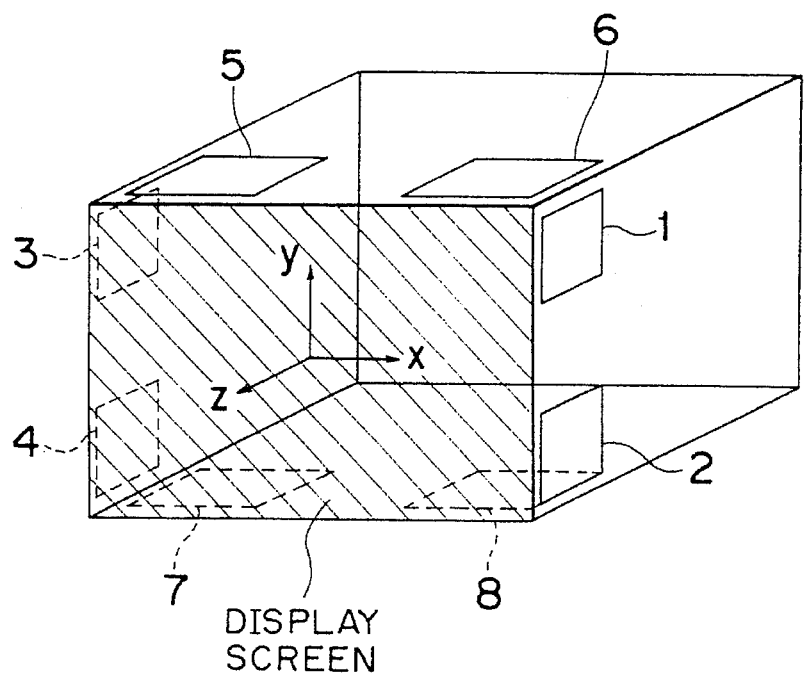
Figure 2C:
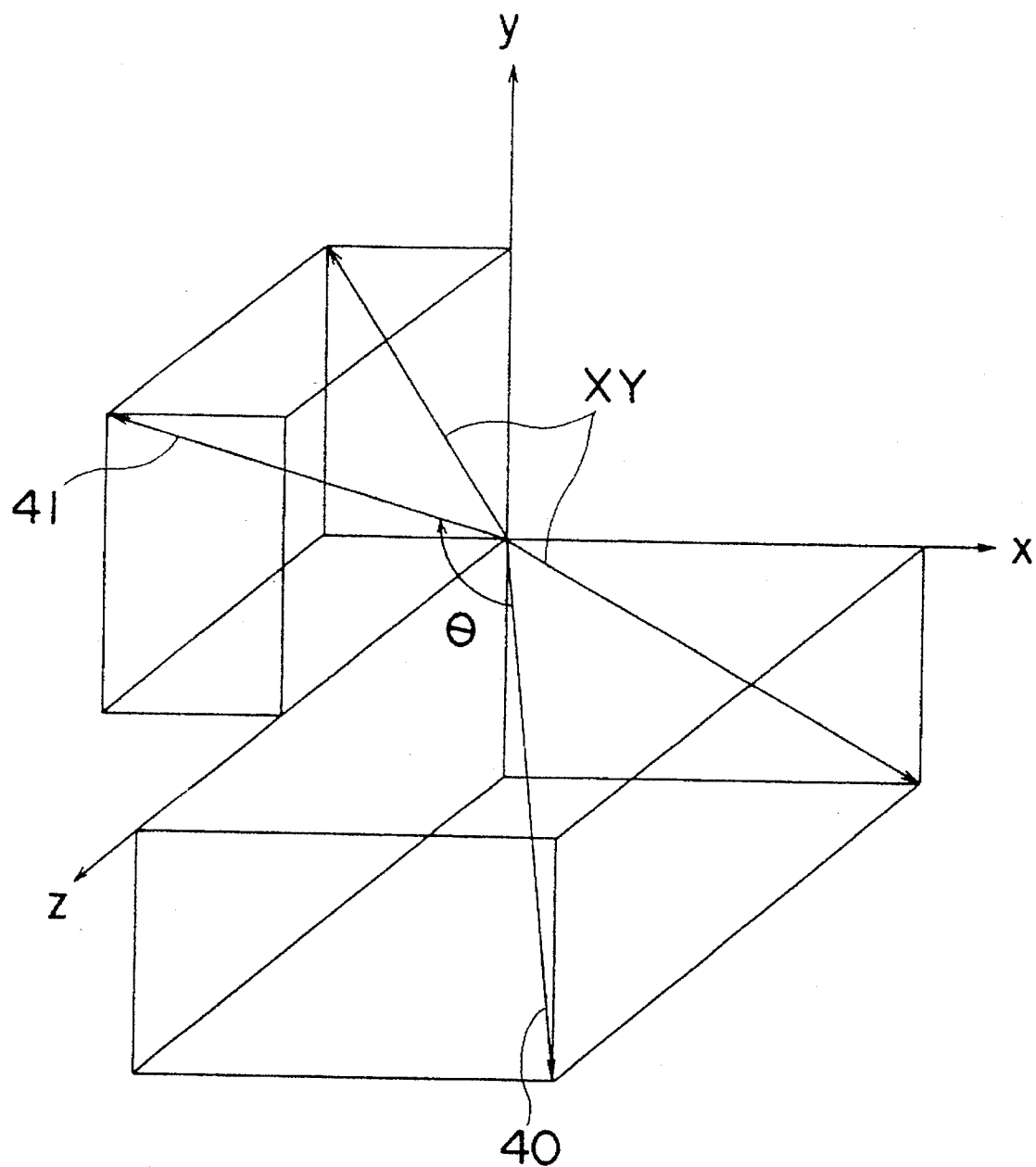
FIGS. 2 (a), 2 (b), and 2 (c) are explanatory views of the operation of the first embodiment.
Figure 3A:
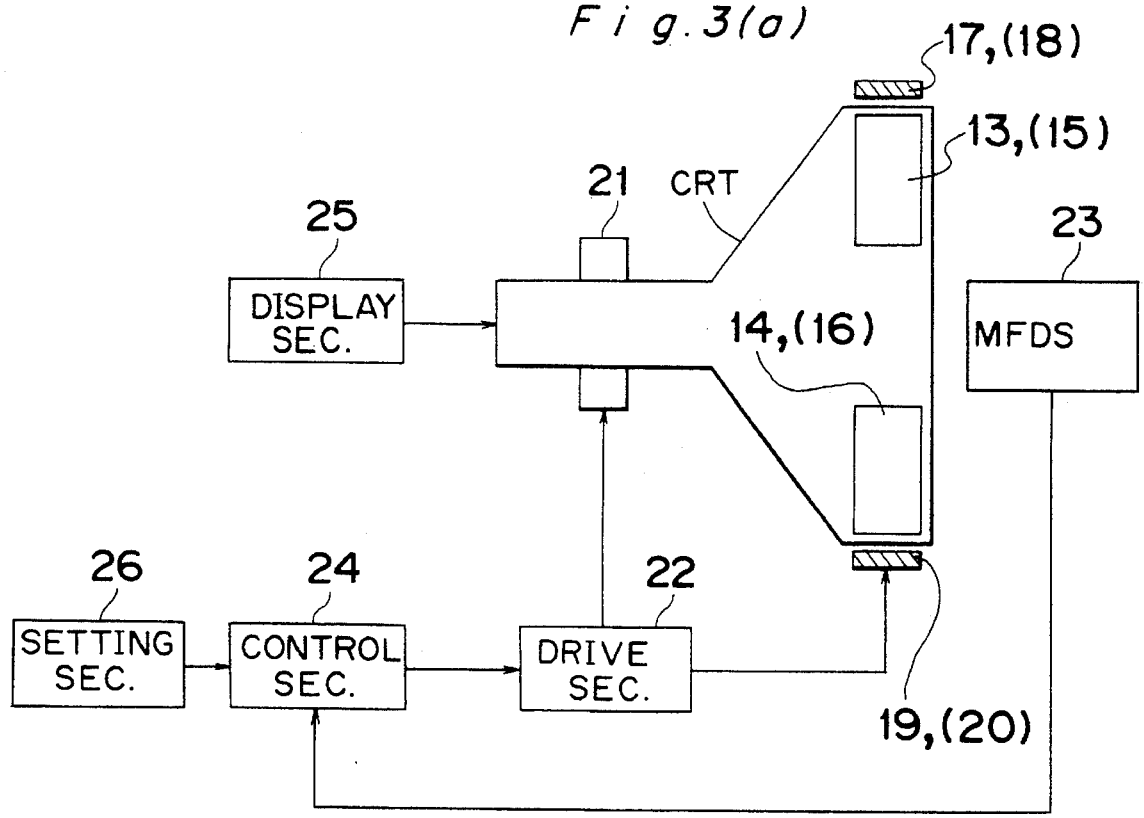
FIG. 3 (a) is a block diagram of a modified example of the first embodiment.
Figure 3B:
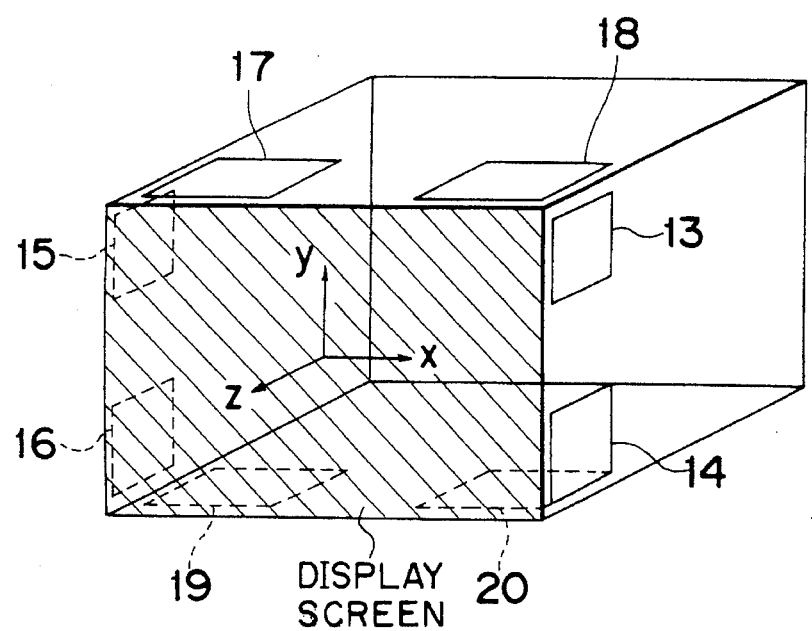

The following describes a first embodiment of a beam landing correction apparatus according to the present invention with reference to FIGS. 1 through 3.

Referring to FIGS. 1(a) and 1(b), the beam landing correction apparatus of the first embodiment comprises a plurality of landing correction coils arranged on peripheral portions of a cathode ray tube (CRT), where the landing correction coils consist of x-axis direction correction coils 1 through 4 for correcting mislanding in the x-axis direction and y-axis direction correction coils 5 through 8 for correcting mislanding in the y-axis direction.

The landing correction coils 1 through 8 are arranged by pairing each of the x-axis direction correction coils 1 through 4 with each of the y-axis direction correction coils 5 through 8 at four peripheral corner portions of the cathode ray tube because large mislanding of electron beams is caused due to a concentration of the geomagnetism at the peripheral portions of the cathode ray tube by an influence of a frame member and the like supporting the cathode ray tube. The x-axis direction correction coils and the y-axis direction correction coils are arranged at peripheral portions of the cathode ray tube in such a manner that the magnetic fields generated by the x-axis direction correction coils and the magnetic fields generated by the y-axis direction correction coils cross each other at right angles. These X-axis direction correction coils 1 through 4 and Y-axis direction correction coils 5 through 8 are respectively paired as coils 1 and 6, coils 2 and 8, coils 3 and 5 and coils 4 and 7, and arranged so that the directions of the magnetic fields generated by the X-axis direction correction coil and Y-axis direction correction coil of each pair cross each other at right angles.

The apparatus further comprises a static landing correction coil 9 for correcting static mislanding of electron beams, which is arranged at a neck portion of the cathode ray tube.

The apparatus is further comprised of a drive section 10 for supplying an electric correction signal to each of the landing correction coils 1 through 9, a control section 11 for controlling the drive section 10 to generate an appropriate correction signal to be supplied to the drive section 10 so as to cancel the influence of the geomagnetism, and a display section 12 for supplying a video signal to the cathode ray tube to display an image of the video signal on a screen of the cathode ray tube.

The following describes the operation of the beam landing correction apparatus of the first embodiment having the construction mentioned above.

In the first embodiment, by arranging a plurality of landing correction coil pairs provided by pairing each of the x-axis direction correction coils 1 through 4 with each of the y-axis direction correction coils 5 through 8 at four peripheral corner portions of the cathode ray tube, the mislanding of beams can be corrected with high accuracy using the resultant correction magnetic field combination of the x-axis component and y-axis component of the correction magnetic field. For example, a pair of the x-axis direction correction coil 1 and the y-axis direction correction coil 6 serve as a landing correction coil pair for correcting the beam mislanding in the upper right portion of the screen of the cathode ray tube in the figure.

The following describes in detail the above-mentioned operation with reference to FIGS. 2 (a) through 2 (c).

FIGS. 2 (a) and 2 (b) show the influence of the geomagnetism exerted on the electron beam movement. FIGS. 2 (a) shows the influence of the geomagnetic field in different geographical directions East, West, South and North and FIGS. 2 (b) shows the influence of the vertical magnetic fields exerted on the movement of an electron beam, where the electron beam on the screen receives different influence depending on the geographical direction and the northern or southern hemispheric condition.

Particularly, in a cathode ray tube (CRT) having a fine shadow mask pitch, the influence of the geomagnetism exerted on the beam movement is an important factor in terms of color purity. Therefore, a uniform image can be displayed by performing landing corrections particularly at peripheral portions with landing correction coils arranged at the peripheral four corner portions of the screen to completely effect cancellation of the influence of the geomagnetism. It is noted here that the cancellation of the influence of the geomagnetism can be achieved by controlling the polarity and the quantity of a direct current potential to be supplied to the landing correction coils in each direction.

Referring to FIG. 2 (c), reference numeral 40 denotes a geomagnetism vector causing a beam mislanding, while reference numeral 41 denotes an electron beam vector. The beam mislanding occurs for the reason that the Lorentz's force is exerted on the electron beam to displace the landing position of the electron beam in the cathode ray tube. In order to remove the mislanding of the electron beam, there are two methods, one for removing the geomagnetic vector to be zero, and the other for making the geomagnetic vector 40 coincide with the electron beam vector 41. The following describes the latter method in more detail.

Assuming now that the geomagnetic vector 40 and the electron beam vector 41 meet at an angle θ, the magnitude of the Lorentz's force causing the beam mislanding depends on the value of sin θ. In other words, the Lorentz's force can be made zero when the geomagnetic direction and the electron beam direction coincide with each other. By this way, the occurrence of the mislanding due to the geomagnetism can be prevented.

In order to effect the former one of the above-mentioned two mislanding cancellation methods, there must be employed three-dimensional correction coil means for correcting the beam mislanding in the x-, y-, and z-axes directions. However, it is difficult to provide the z-direction correction coil without preventing the electron beam projection to the screen regarding the construction of the color television receiver, and therefore the latter method is more practical.

For the above reasons, it is necessary to provide landing correction coil pairs capable of generating magnetic fields in the x-axis and y-axis directions in order to achieve a high-accuracy correction with cancellation of the influence of the geomagnetism, and therefore it is required to vary the component force in the x-y plane of the geomagnetic vector by means of the resultant combined vector of correction component forces in the x-axis and y-axis directions to make the geomagnetic direction coincide with the electron beam direction.

Taking the aforementioned factors of the beam mislanding due to the geomagnetism into account, it is impossible to make the geomagnetic direction coincide with the electron beam direction even by fixing the magnetic field direction generated by the landing correction coil and varying the magnitude of the magnetic field as exemplified in FIG. 1 (b). In other words, a high-accuracy correction can be achieved by varying the magnitude and direction of the correction magnetic field vector generated by the x-axis direction correction coil and the y-axis direction correction coil to vary the geomagnetic direction thereby making the geomagnetic direction coincide with the electron beam direction.

Figure 15:
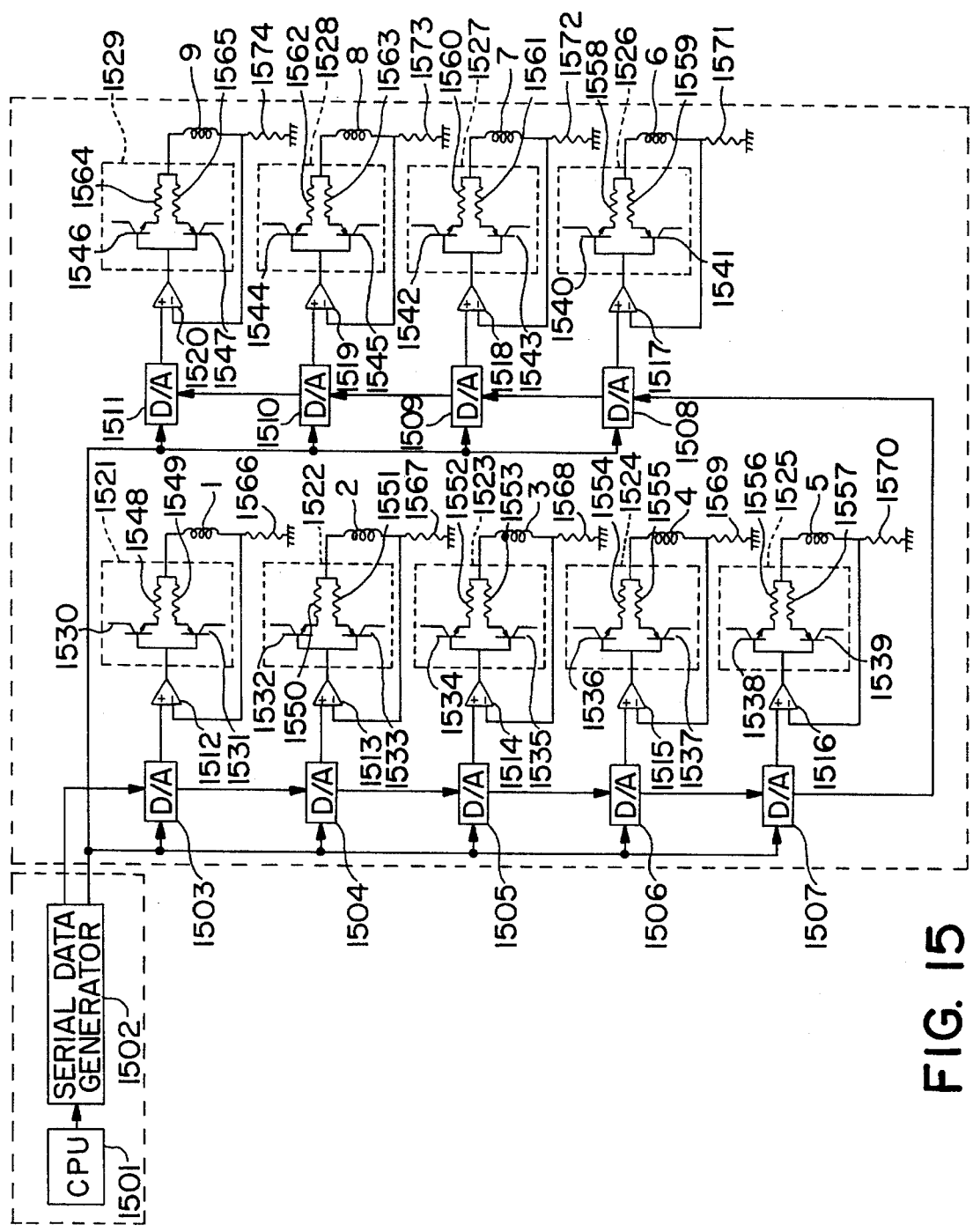
FIG. 15 is a circuit diagram of a drive section and a control section in accordance with the first embodiment of the present invention.
Figure 16A:
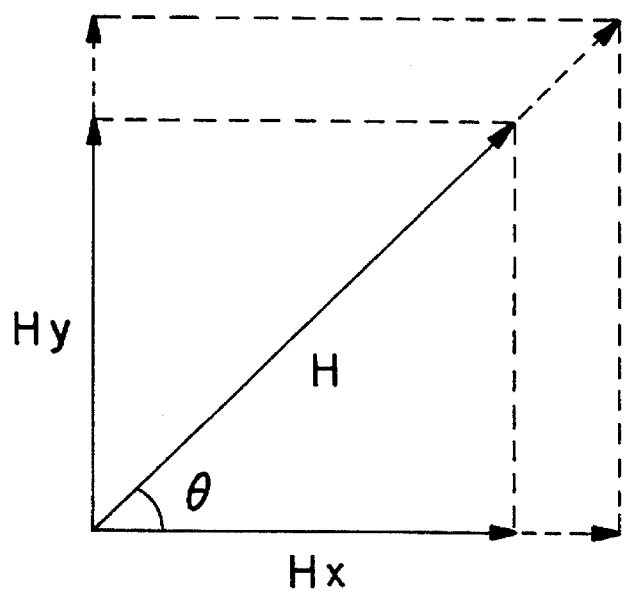
FIGS. 16 (a) and 16(b) are display views each showing a correction magnetic field generated by a correction coil of the first embodiment.
Figure 16B:
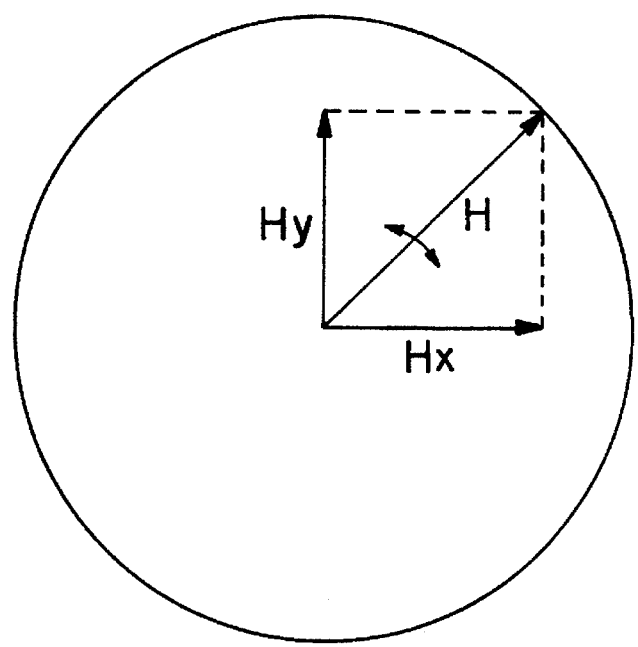
Figure 17A:
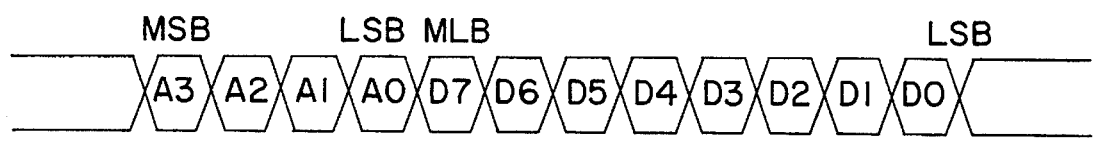
FIGS. 17(a), 17(b) and 17(c) are timing charts showing the operation of the drive section of the first embodiment.
Figure 17B:
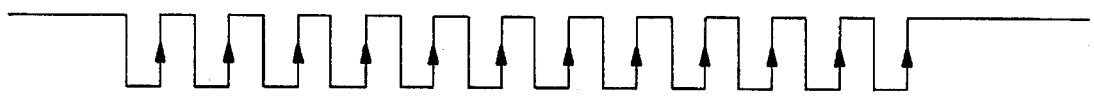

Further by providing the peripheral landing correction coils 1 through 8 as in the present embodiment, it becomes possible to reduce a correlation on the display screen of a color television, i.e., it is possible to prevent a phenomenon that a correction effected at a portion increases a mislanding amount at another portion. In the present embodiment, further the static correction coil 9 is provided at the neck portion of the cathode ray tube to permit a static correction of the beam mislanding. Next, a concrete control method for the above-described landing correction coils is described with reference to FIGS. 15 through 17. FIG. 15 is a detailed construction view of a drive section 10 and a control section 11, FIGS. 16(a) and 16(b) are views displaying the correction magnetic fields generated by the correction coil pairs coils 1 and 6, coils 2 and 8, coils 3 and 5, and coils 4 and 7, and FIGS. 17(a)–17(b) are operating waveform diagrams of the drive section 10. In FIG. 15, reference numeral 1501 denotes a CPU for generating correction data for the above-described X-axis direction correction coils 1 to 4, Y-axis direction correction coils 5 to 8 and static correction coil 9 and a control signal for the D/A convertor to be described later; reference numeral 1502 denotes a serial data generating circuit for converting the correction data of the CPU into serial data suitable for the D/A converter to be described later, reference numerals 1503 through 1511 denote D/A convertors for converting serial data generated by the serial data generating circuit into analog signals, reference numerals 1512 through 1520 denote operation amplifiers for supplying control voltage to current amplifiers to be described later, reference numerals 1521 through 1529 denote current amplifiers for supplying correction currents to respective correction coils, reference numerals 1530 through 1547 denote transistors constituting respective current amplifiers, reference numerals 1548 through 1565 denote resistors constituting respective current amplifiers, and reference numerals 1566 through 1574 denote feed-back resistors for stabilization of currents.

The operation of the drive section 10 and control section 11 constructed as described above is described below. In the first place, the control method for controlling the correction magnetic fields of correction coil pairs (1 and 6), (2 and 8), (3 and 5) and (4 and 7) constituted by the X-axis direction correction coils 1 through 4 and Y-axis direction correction coils 5 through 8 by CPU 1501 is described. The control method for the correction magnetic field includes the control of the magnetic field intensity and that of the magnetic field direction. The control method for the magnetic field intensity is described with reference to FIGS. 16(*a*) and 16(*b*). In order to change the intensity of the correction magnetic field without changing the direction thereof, assuming, for example, that the direction of the correction magnetic field as shown in FIG. 16(*a*) is θ, where $H_x$ is the magnetic field generated by the X-axis direction correction coil, and $H_y$ is the magnetic field generated by the Y-axis direction correction coil, the following relation below is used.

$$\theta = \tan^{-1}(H_y/H_x) = \text{const.}$$

CPU 1501 generates correction data in order to control the field intensity of correction magnetic field. The correction data makes the ratio $H_y/H_x$ constant between the magnetic fields $H_x$ and $H_y$ generated by the X-axis direction correction coil and Y-axis direction correction coil for respective correction coil pairs (1 and 6), (2 and 8), (3 and 5) and (4 and 7) is generated by CPU 1501. In other words, assuming that the correction data of the X-axis direction correction coil and that of the Y-axis direction correction coil are $D_x$ and $D_y$, respectively, CPU 1501 controls the intensity of the correction magnetic field of each of the correction coil pairs (1 and 6), (2 and 8), (3 and 5) and (4 and 7) by controlling $D_x$ or $D_y$, while satisfying the relation $D_y = k D_x$ (where k: const.).

Next, the control of the direction of the correction magnetic field is described. In order to control the direction of the correction magnetic field while maintaining the magnetic field intensity constant, the equation below is used. The intensity of the magnetic field generated by the X-axis direction correction coil is $H_x$, the magnetic field generated by Y-axis direction correction coil is $H_y$ and the field intensity of the resultant magnetic field of $H_x$ and $H_y$ is H.

$$H = \sqrt{(H_x^2 + H_y^2)} = \text{const.}$$

Therefore, assuming that the data of the X-axis direction and Y-axis direction correction coils are $D_x$ and $D_y$, respectively, CPU 1501 controls the direction and intensity of the correction magnetic field of the correction coil pairs (1 and 6), (2 and 8), (3 and 5) and (4 and 7) by controlling $D_x$ or $D_y$ while satisfying the relation below.

$$D_y = \pm \sqrt{(k - D_x^2)} \quad \text{where } k \text{ is a constant}$$

Figure 17C:

In the serial data generating circuit 1502, serial data as shown in FIG. 17(*a*) is generated based on the correction data from CPU 1501. In the serial data shown in FIG. 17(*a*), address (A3 to A0) and data (D7 to D0) are time-division multiplexed, and based on the address (A3 to A0), the selection of serially connected D/A convertors 1503 through 1511 is effected and thereafter, the outputs of D/A convertors are controlled by the data (D7 to D0). The clock signal and load signal which are the control signals for writing the serial data into the D/A convertors 1503 through 1511 are shown in FIGS. 17(*b*) and 17(*c*), respectively. In D/A convertors 1503 through 1511, data is input at LOW level of the load signal in FIG. 17(*c*) and is input at the positive edge of the clock signal in FIG. 17(*b*).

As described above, according to the first embodiment of the present invention, by pairing X-axis direction correction coils and Y-axis direction correction coils as described above and controlling the intensity and direction of the resultant magnetic field of the magnetic fields generated by these coils, landing correction can be effected independently and with a high accuracy at four peripheral corners of a CRT.

Figure 18:
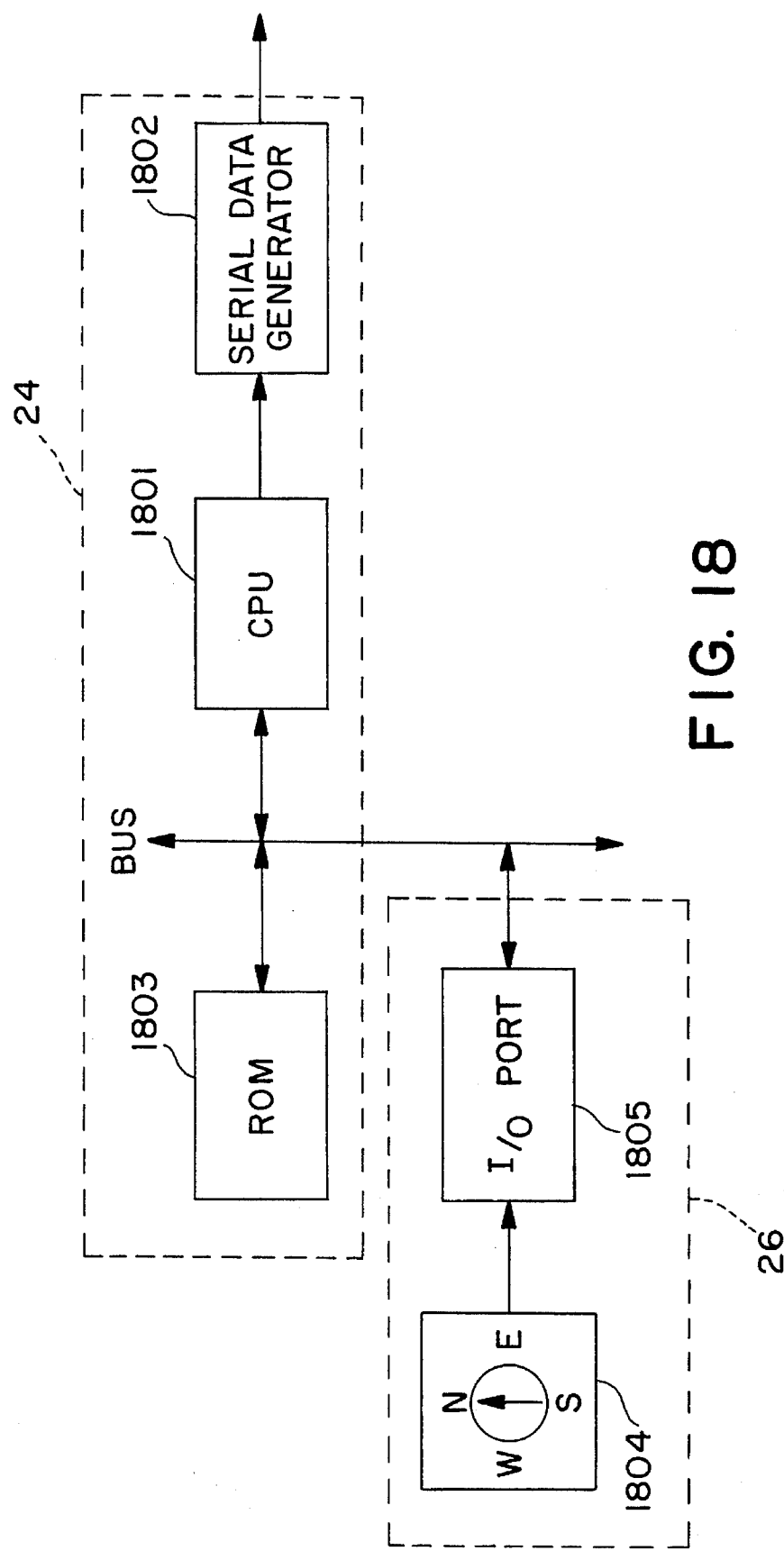
FIG. 18 is a block diagram of a control section and a setting section in accordance with the second embodiment.

FIGS. 3 (*a*) and 3 (*b*) show a modified example of the landing correction apparatus having the same construction as that of the first embodiment except employing a magnetic field detecting section (MFDS) and a geomagnetism direction setting section. Referring to FIGS. 3 (*a*) and 3 (*b*), the beam landing correction apparatus comprises partial landing correction coils 13 through 20, a static correction coil 21, a drive section 22 for supplying a correction current signal to the above-mentioned correction coils, in the same manner as that of the first embodiment. The apparatus further comprises a magnetic field detection section (MFDS) 23 for externally detecting the intensity and direction of the geomagnetism at various portions of the display screen. MFDS 23 is a magnetic field detection section constituted, for example, by three Hall elements for detecting the X-axis, Y-axis and Z-axis (CRT screen direction) components of geomagnetism. The apparatus also comprises a control section 24 for controlling the drive section 22 by generating a control signal in response to receiving the geomagnetic field intensity and direction output from the magnetic field detection section 23, a display section 25 for displaying an image on the screen of the cathode ray tube, and a setting section 26 for manually setting the direction of the geomagnetism, thereby to achieve an automatical landing correction. The operation of the landing correction apparatus is described below with reference to FIG. 18 which shows the detailed construction of the control section 24 and the setting section 26. The explanation of the drive section 22 is omitted because it is similar to the previous description made with reference to FIG. 15. In FIG. 18, reference numeral 1801 denotes a CPU for supplying correction data to a serial data generating circuit 1802, reference numeral 1803 denotes a ROM with correction data according to the geomagnetic field direction written therein, reference numeral 1804 denotes a geomagnetism direction setting section like a rotary switch for generating a signal corresponding to the direction of geomagnetism in the case of manual adjustment, and reference numeral 1805 denotes an I/O port which allows CPU 1801 to access the directional data set by said geomagnetism direction setting section 1804.

First, an automatic adjustment case is described. The geomagnetism at the peripheral area is first detected by the magnetic field detection section 23. Next, based on the detected direction of geomagnetism, CPU 1801 refers to the table of correction data written in ROM 1803, and supplies correction data based on the detected geomagnetism direction to the serial data generating circuit 1802. The control method for the drive section 22 and the correction magnetic fields of correction coil pairs (13 and 18), (14 and 20), (15 and 17), and (16 and 19) is the same as described previously in the first embodiment, and therefore, the explanation is omitted.

The case of manual adjustment is described below. The direction of geomagnetism is first set by the geomagnetism direction setting section 1804. Then, CPU 1801 reads out data on geomagnetism direction via I/O port 1805 and generates data corresponding to geomagnetism direction using ROM 1803. The subsequent steps are the same as in the automatic adjustment after detection of magnetic field.

Figure 22A:
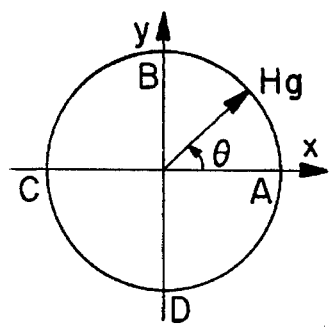
FIGS. 22(a)–22(c) and 23(a)–23(d) are graphs for demonstrating the calculation of the contents of the correction data table.
Figure 22B:
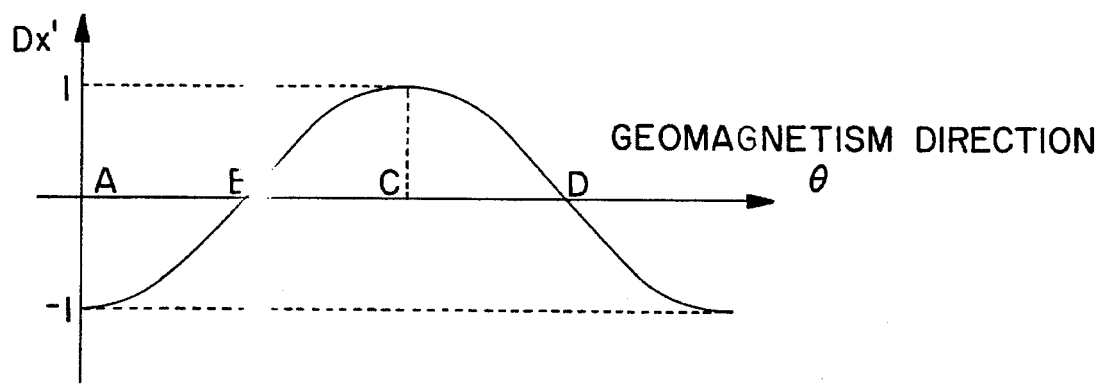
Figure 22C:
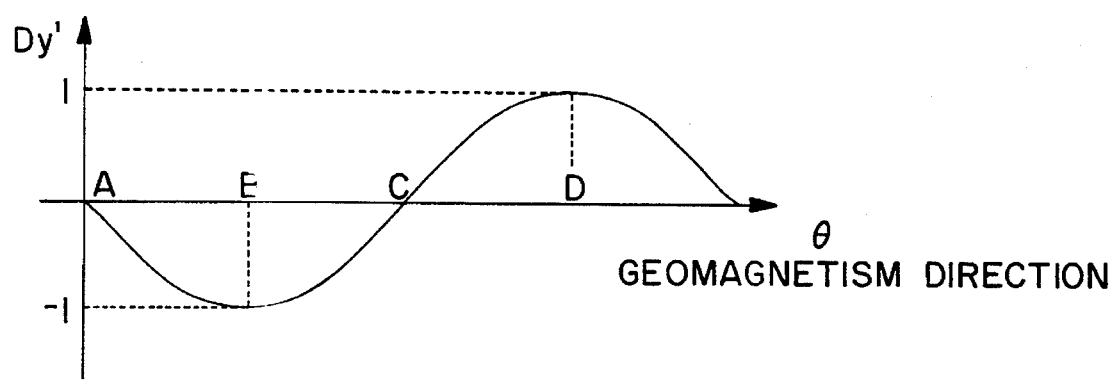
Figure 23A:
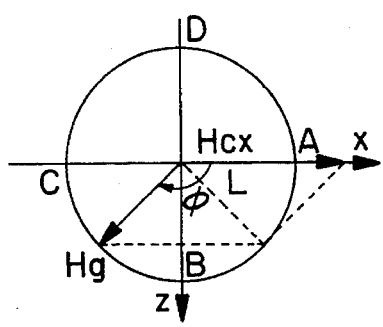
Figure 23B:
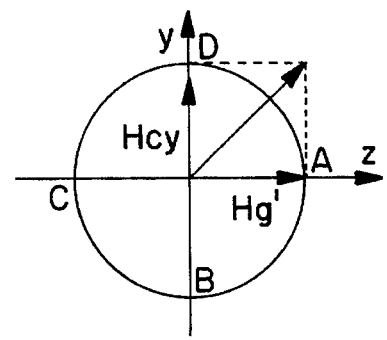
Figure 23C:
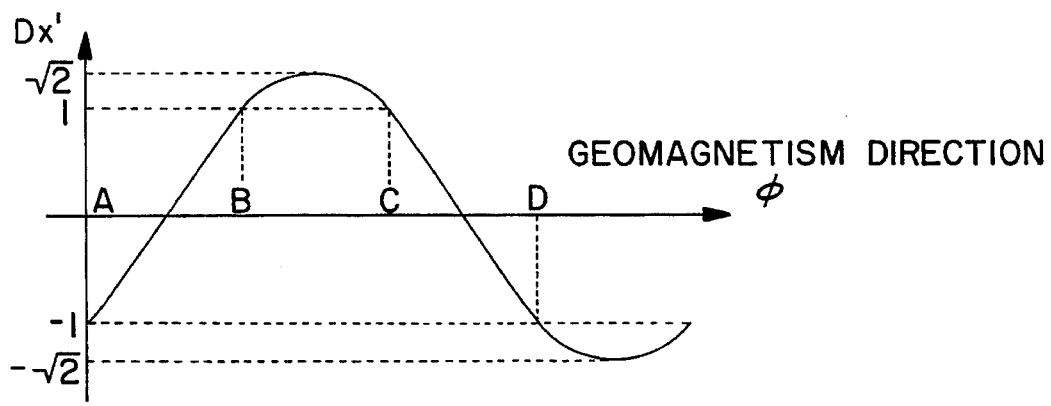
Figure 23D:
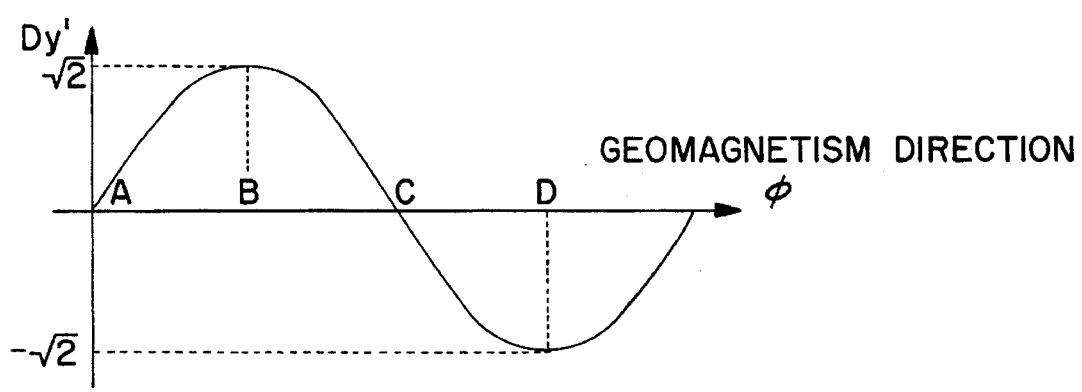

The following describes the method of calculating the contents of the table in ROM 1803 having the correction data recorded with respect to the geomagnetism direction with reference to FIGS. 22(*a*)–22(*c*) and 23(*a*)–23(*d*). It is noted here that the description reference is made regarding the correction coil pair (1, 6) shown in FIG. 1.

Referring to FIGS. 22(*a*) through 22(*c*), Dx' and Dy' denote correction data of the x-direction correction coil 1 and y-direction correction coil 6 of the coil pair with respect to the geomagnetism direction, respectively, in the case where the geomagnetism components vary in the x-y plane of the xyz coordinate system shown in FIG. 1. While, referring to FIGS. 23(*a*) through 23(*d*), Dx' and Dy' denote correction data of the x-direction correction coil 1 and y-direction correction coil 7 of the coil pair with respect to the geomagnetism direction, respectively, where the geomagnetism components varies in the x-z plane of the xyz coordinates system shown in FIG. 1. It is noted here that the correction data is normalized based on the correction data necessary for correcting the absolute value (magnitude) of the geomagnetism vector in the x and y directions.

As shown in FIG. 22(*a*), where the geomagnetism component Hg varies in the x-y plane, the correction data (Dx', Dy') of the correction coil pair with respect to the geomagnetism direction θ are as shown in FIGS. 22(*b*) and 22(*c*), having characteristics of:

$$Dx' = -\cos\theta \quad (1)$$

$$Dy' = -\sin\theta \quad (2)$$

As shown in FIG. 23(*a*), in the case where the geomagnetism component Hg varies in the x-z plane, the influence of the geomagnetism is cancelled by fixing the geomagnetism direction coincident with the radiation direction of the electron beams, as mentioned in the embodiment.

In order to effect this cancellation, initially, the geomagnetism direction is made coincident with the electron beam radiation direction in the x-z plane as shown by a dotted line L in FIG. 23(*a*). In the case where the geomagnetism component Hg is directed as shown in FIG. 23(*a*), a correction magnetic field Hcx in the x-direction is added in order to correct the component Hg to be coincident with the L direction. Then, as shown in FIG. 23(*b*), in order to make the geomagnetism direction coincident with the electron beam radiation direction in the y-z plane, a y-directional magnetic filed Hcy is added to Hg' (=Hg+Hcx). By effecting these operations with respect to each geomagnetism direction φ, the correction data can be calculated as shown in FIGS. 23(*c*) and 23(*d*). Namely, the correction data with respect to the geomagnetism direction φ are represented as following:

$$Dx' = \sin\phi - \cos\phi \quad (3)$$

$$Dy' = \sqrt{2^*}\sin\phi \quad (4)$$

The table has the correction data represented by the formulas (1) through (4) of an appropriate number of samples with respect to the geomagnetism direction θ and φ, so that the correction data corresponding to the detected geomagnetism direction is read out of the table.

Although the description is made with reference to only the correction coil pair (1, 6), other correction data of the correction coil 2 is the same as that of the correction coil 1, and those of the correction coils 3 and 4 have reversed ± symbols to that of the correction coil 1. Also, the correction data of the correction coil 5 is the same as that of the correction coil 6, and those of the correction coils 7 and 8 have reversed ± symbols to that of the correction coil 6.

The following describes the operation of the landing correction apparatus having the construction mentioned above. The automatical landing correction of the landing correction apparatus is realized by providing the magnetic field detection section 23 for detecting the intensity and direction of the geomagnetism. The output of the magnetic field detection section (MFDS) 23 is transmitted to the control section 24 which generates a control signal according to the received detection values of the intensity and direction of the geomagnetism thereby to control the drive section 22 for supplying a correction current signal to each of the correction coils 13 through 20 and 21. It is noted that correction data corresponding to the intensity and direction of the geomagnetism are already stored in the control section 24 as described in the first embodiment. It is also possible to manually set the direction of the geomagnetism by providing the setting section 26.

Although the partial landing correction coils 1 through 8 and 13 through 20 have rectangular shapes in the present embodiment, it is of course effective that they have other shapes.

Embodiment 2

Figure 4A:
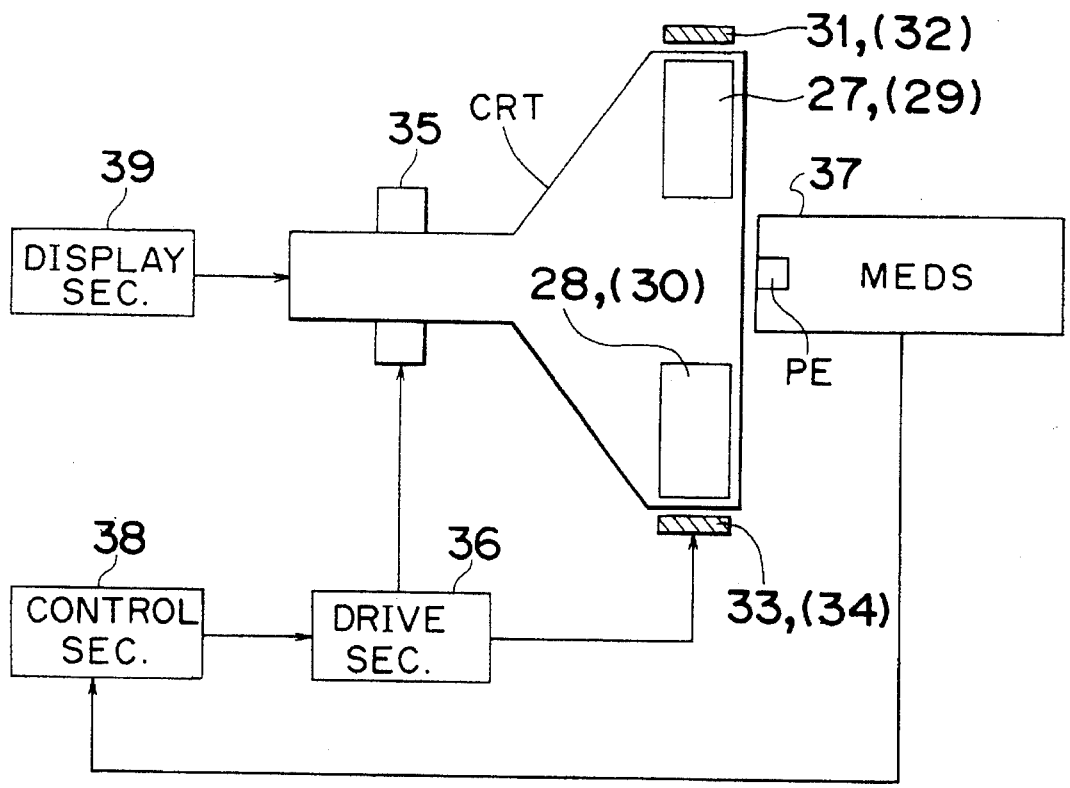
FIG. 4 (a) is a block diagram of a beam landing correction apparatus in accordance with a second embodiment of the present invention.
Figure 4B:
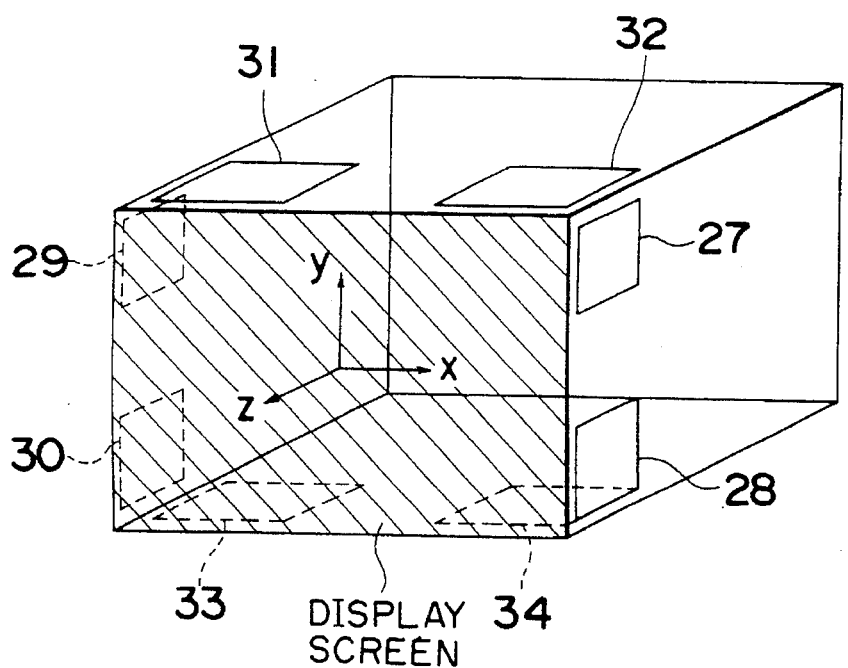

FIG. 4 (*a*) shows a beam landing correction apparatus in accordance with a second embodiment of the present invention, while FIG. 4 (*b*) shows an arrangement of the partial landing correction coils, which has a similar construction to that of the first embodiment except employing a mislanding error detection section (MEDS). Referring to FIGS. 4 (*a*) and 4 (*b*), the present apparatus comprises peripheral landing correction coils 27 through 34, a static correction coil 35, a drive section 36 for supplying a, correction current to the above-mentioned correction coils in the same manner as that of the first embodiment. Reference numeral 37 denotes a color CCD camera for detecting chrominance and luminance on the display screen in order to detect mislanding errors on the color television display screen, reference numeral 38 denotes a control section which detects mislanding errors from the output of the color CCD camera 37 and supplies correction data eliminating the errors to the drive section 36 which drives respective correction coil pairs (27 and 32), (28 and 34), (29 and 31) and (30 and 33) and static correction coil 35, and reference numeral 39 denotes a displaying section for displaying an image on the CRT.

Figure 19:
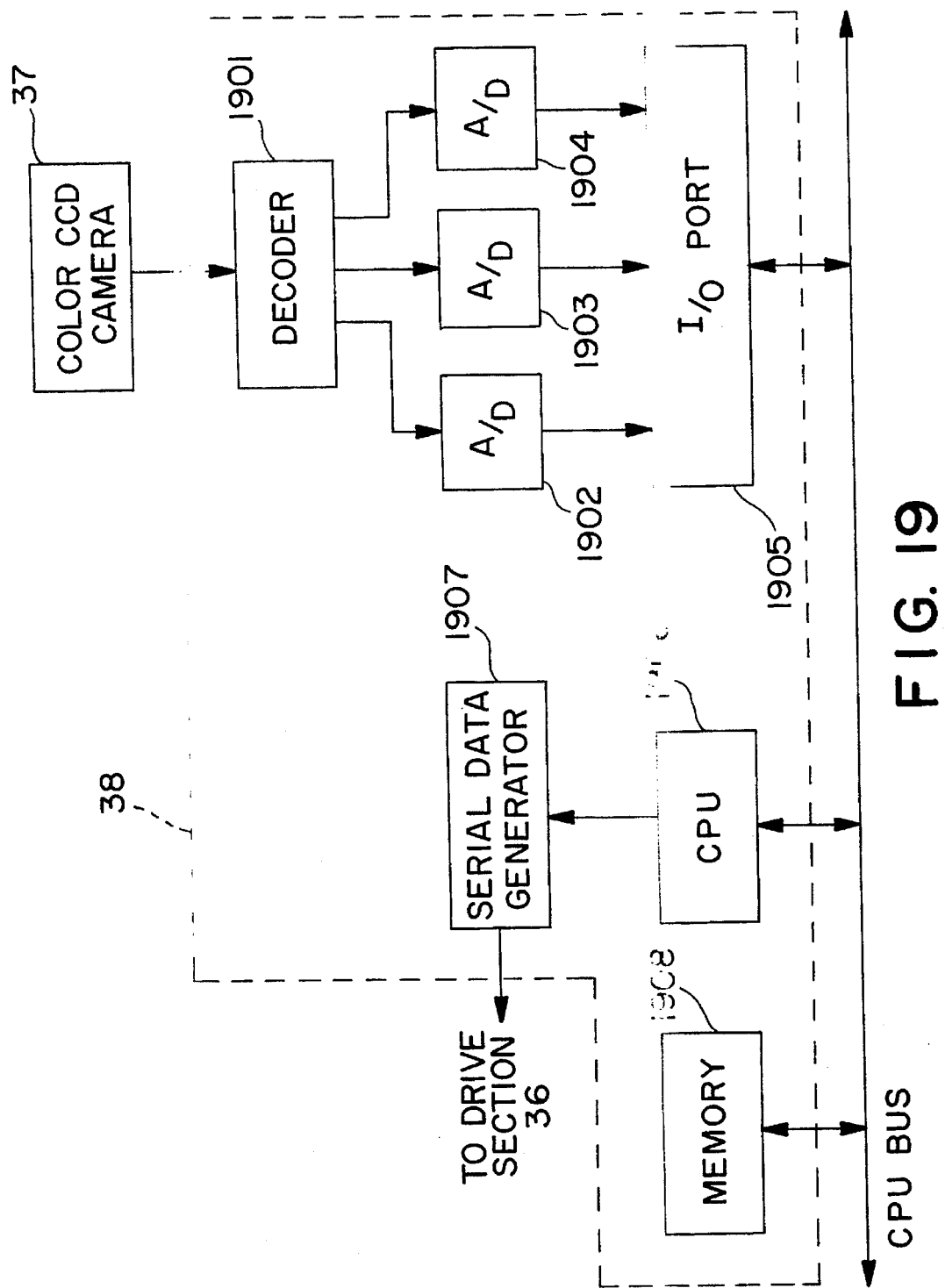
FIG. 19 is a block diagram of a control section in accordance with the third embodiment of the present invention.

The operation of the mislanding correction apparatus is described below with reference to FIG. 19 which shows a detailed construction of the control section 38. In FIG. 19, reference numeral 1901 denotes a decoder for decoding an image signal (for example, of NTSC specification) of the color CCD camera into signal components of R (red), G (green) and B (blue), reference numerals 1902 through 1904 are A/D convertors for converting the decoded R, G, and B signals decoded by the decoder into digital data, reference numeral 1905 is an I/O port which enables the CPU to access the data output by the A/D convertors 1902 through 1904, reference numeral 1906 denotes a CPU for (1) detecting chrominance and luminance on the display screen from the output of the A/D convertor 1901, (2) calculating the mislanding error based on the detection result, and (3) generating correction data eliminating the mislanding error, reference numeral 1907 denotes a serial data generating circuit for generating the serial data to control the drive section 36 based on the correction data generated by the CPU 1906, and reference numeral 1908 denotes a memory for storing the reference value for the correction and correction data.

During the operation of the beam mislanding correction, the color CCD camera 37 is positioned to detect a portion to be subjected to correction on the display screen of CRT. The luminance components of R, G and B, for example, of a completely white signal displayed on the display screen by the display section 39 are detected by the color CCD camera and decoder 1901. Next, CPU 1906 calculates the luminance and chrominance of the completely white signal based on the detected R, G, and B luminance components. CPU 1906 further obtains the mislanding error from the calculated luminance and chrominance and the reference value stored in the memory 1908 using the following evaluation equation.

$$Y=Y1/Y0$$

$$r=\sqrt{((x-x_0)^2+(y-y_0)^2)}$$

where Y0: the reference value of luminance, $x_0$, $y_0$: the reference values for chrominance (for example, when D=65:x=0.313, y=0.329)

Y1: luminance at the correction point x, y: chrominance at the correction point

Y, r: error in luminance and error in chrominance relative to the reference value.

CPU 1906 calculates the mislanding error by the above equation, and generates the correction data such that this error becomes zero. The correction data is supplied to the serial data generating circuit 1907. The generating method for the serial data, and the construction and operation of the drive section 36 for driving respective correction coil pairs (27 and 32), (28 and 34), (29 and 31) and (30 and 33) and the static correction coil 35 and the control method for the correction magnetic fields generated by respective correction coil pairs is the same as in the first embodiment. Therefore, the explanation the method of operation and the construction of the components are omitted.

In this case, the method for convergence, for example, in the correction is to determine the point at which the error in chrominance is in a specified allowable range relative to the reference value and the maximum luminance is achieved in the same range as the convergence point. Here, according to the result of a visual image quality evaluation experiment, it is appropriate to determine the allowable range so that the error in chrominance is within the range of 0.01 from the reference point. In the correction procedure, after effecting the static landing correction, a partial correction is effected at the peripheral portions of the CRT.

As described so far, according to the second embodiment of the present invention, the mislanding error is calculated by detecting the luminance and chrominance am specified correction portions on the CRT display screen. In addition, the intensity and direction of each of the correction coil pairs is independently controllable for the X-axis direction correction coils and Y-axis direction correction coils arranged on the peripheral portions of CRT. As a result, the landing correction can be effected independently and with a high accuracy at the peripheral four corners of the CRT.

Although the correction is effected with more weight put on the chromaticity between the luminance and chromaticity in the two-dimensional area of an image in the second embodiment, the correction may be effected putting more weight on the luminance at need.

Embodiment 3

Figure 6:
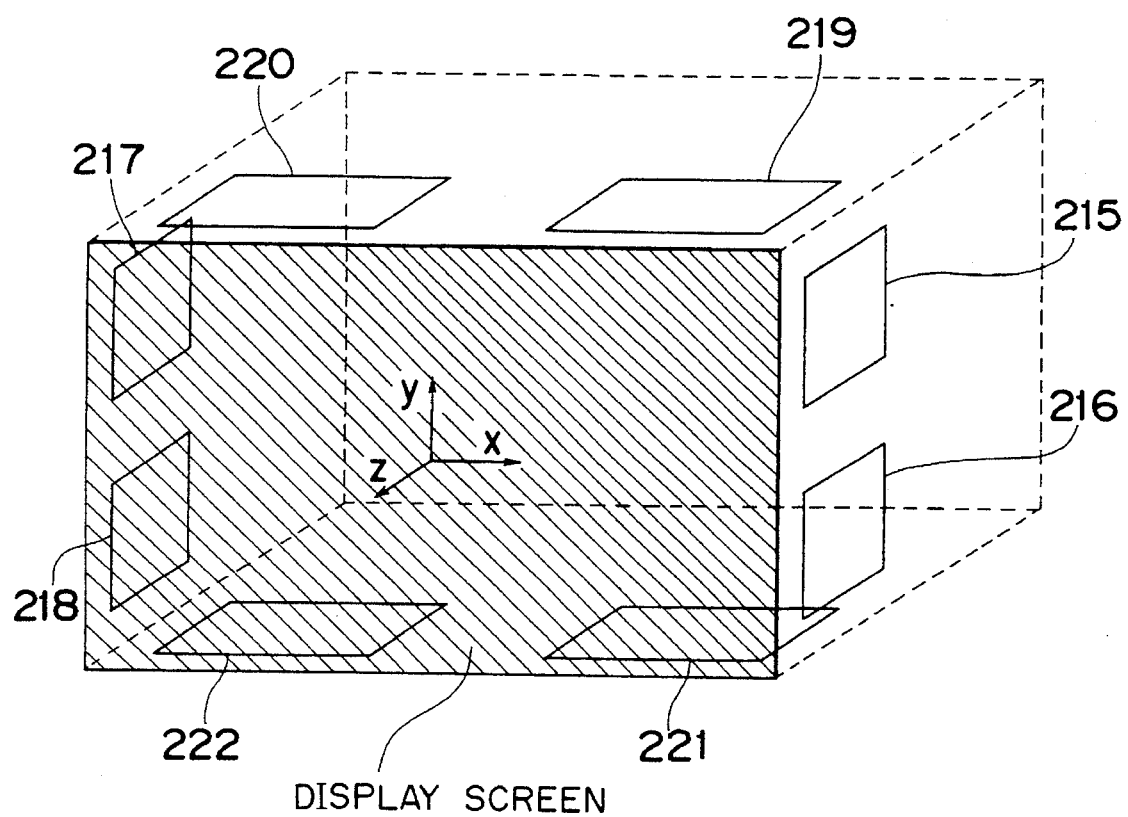
FIG. 6 is a schematic view showing an arrangement of landing correction coils of the third embodiment.
Figure 7:
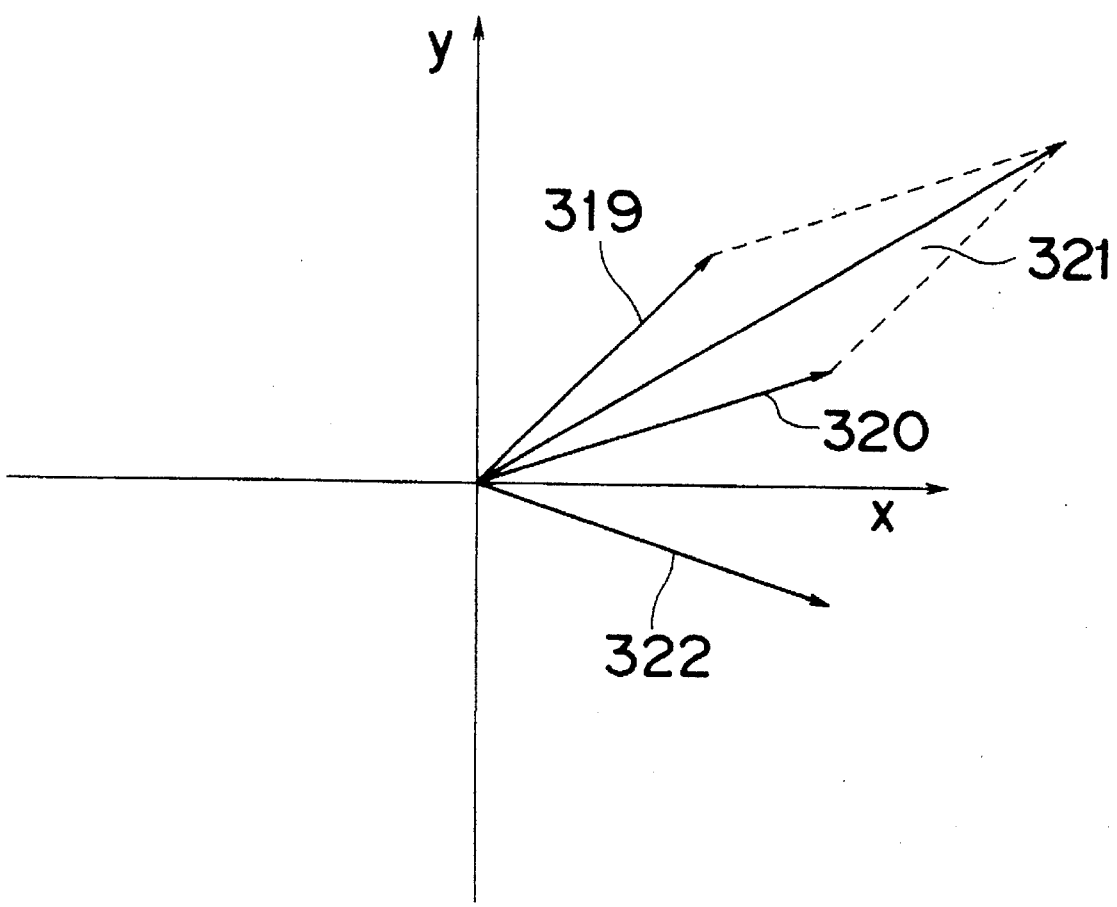
FIG. 7 is an explanatory view of the operation of the third embodiment.

FIGS. 5 through 7 shows a beam landing correction apparatus in accordance with a third embodiment of the present invention.

Reference numerals 207 and 208 denote respectively a X-axis direction correction coil and a Y-axis direction correction coil which constitutes a partial correction coil pair at a peripheral corner of the CRT with two coils, reference numerals 209 and 210 denote current amplifiers of the common voltage-control type for supplying current to these coils, and reference numeral 211 denotes a gain control section for generating an adjustment voltage for controlling the gains of the current amplifiers 209 and 210. The apparatus further comprises a correction magnetic field direction setting section (CMFDS) 212 for setting the magnetic field direction of the landing correction which is effected by the resultant combined vector formed by the two coils of the x-axis direction correction coil Cx and the y-axis direction correction coil Cy, a correction magnetic field intensity adjustment section (CMFIAS) 213 for adjusting the landing correction magnetic field intensity, and a control section 214 for controlling the correction magnetic field direction setting section (CMFDS) 212 and the correction magnetic field intensity adjustment section (CMFIAS) 213.

Referring to FIG. 6, the x-axis direction correction coil Cx consisting of landing correction coils 215 through 218 and the y-axis direction correction coil Cy consisting of landing correction coils 219 through 222 are arranged at peripheral portions of the cathode ray tube in such a manner that the magnetic fields generated by x-axis direction correction coils 215 through 218 and the magnetic fields generated by y-axis direction correction coils 219 through 222 cross each other at right angles in the same manner as in the first and second embodiments.

The following describes the operation of the landing correction apparatus of the third embodiment having a construction as mentioned above.

Referring to FIG. 7, it is assumed that, reference numeral 319 denotes an x-y plane component of the geomagnetism, reference numeral 320 denotes a correction magnetic field vector generated by the landing correction coils, reference numeral 321 denotes the resultant combined vector of the correction magnetic field generated by the landing correction coil and the geomagnetism, and reference numeral 322 denotes a target value of the vector to which the magnetic field direction and magnetic field intensity shall be adjusted. When the resultant combined vector 321 of the correction magnetic field 320 and the geomagnetic vector 319 coincide with the target value 322 of the vector, the resultant combined vector of the z-axis direction component (component in the direction toward the screen) of the geomagnetism and the target value 322 coincides with the electron beam direction to allow the influence of the mislanding due to the geomagnetism to be canceled.

Figure 20:
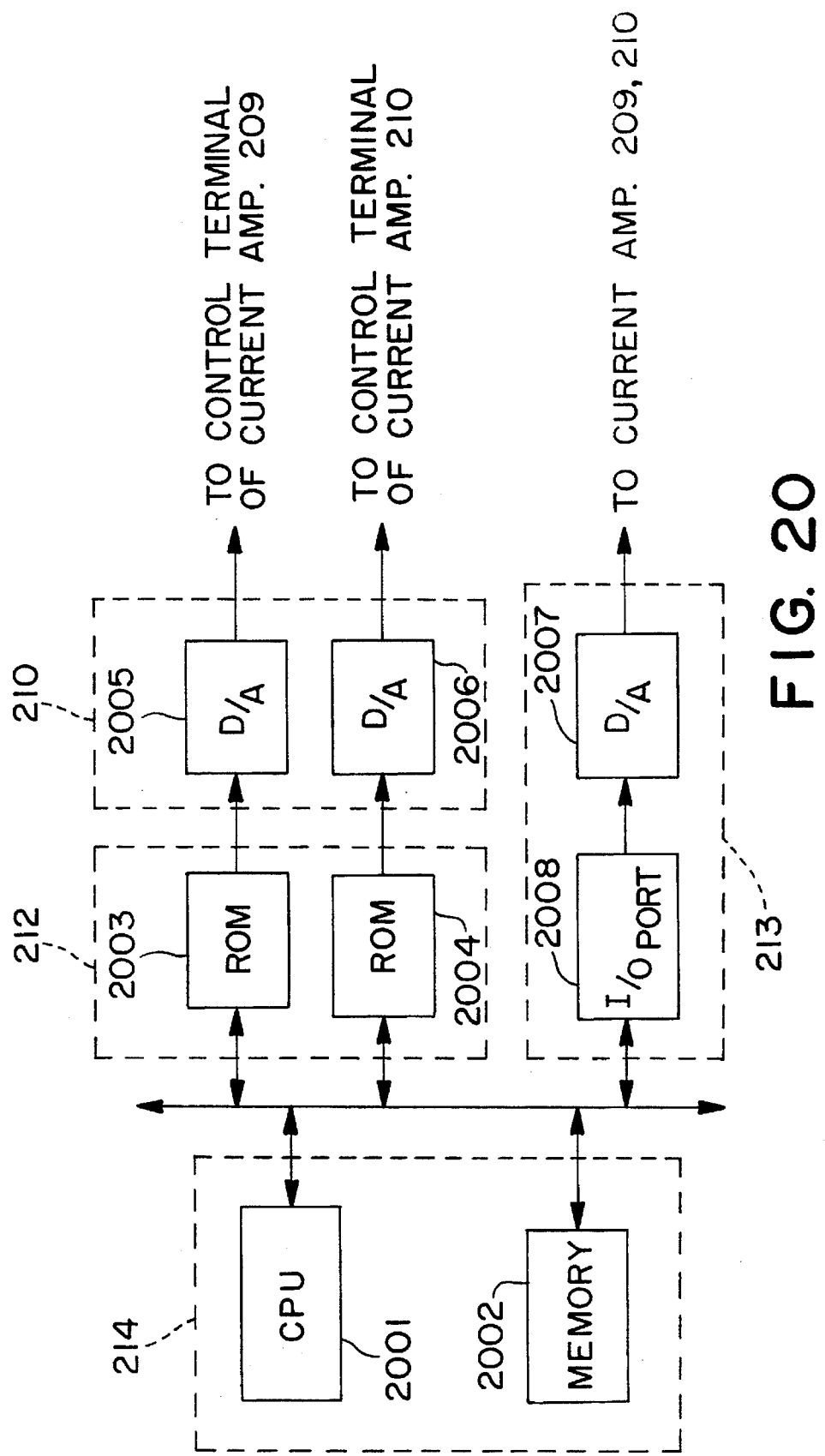
FIG. 20 is a block diagram of a correction magnetic field direction setting section, correction magnetic field intensity setting section, gain control section, and a control section in accordance with the third embodiment.

The control method for controlling the correction magnetic field generated by the partial correction coil pair constituted by X-axis direction correction coil 207 and Y-axis direction correction coil 208 is described below with reference to FIG. 20. FIG. 20 is a detailed view of a correction magnetic field direction setting section 212, a correction magnetic field intensity setting section 213, a gain control section 210 and a control section 214.

In FIG. 20, reference numeral 2001 denotes a CPU for supplying the magnetic field direction setting data and magnetic field intensity setting data to the correction magnetic field direction setting section 212 and correction magnetic field intensity setting section 213. Reference numeral 2002 is a memory storing the control procedure, reference numerals 2003 and 2004 are ROMs for generating the corresponding gain control data for current amplifiers 209 and 210 in response to the magnetic field direction setting data generated by CPU 2001, reference numerals 2005 and 2006 are D/A convertors for converting gain control data generated by the ROMs 2003 and 2004 into analog quantities, reference numeral 2007 denotes D/A convertor for supplying the inputs of current amplifiers 209 and 210, and reference numeral 2008 denotes an I/O port to allow the CPU 2001 to access D/A convertor 2007.

In the adjustment procedure, CPU 2001 first generates the correction magnetic field direction setting data. This correction magnetic field direction setting data has a specific code exclusively for a magnetic field direction generated. Next, based on this code, ROMs 2003 and 2004 generate magnetic field direction setting data 234 and 235 for X-axis direction correction coil 207 and Y-axis direction correction coil 208. Here, assuming the magnetic field direction setting data for X-axis direction correction coil 207 and Y-axis direction correction coil 208 to be $D_x$ and $D_y$, respectively, the data satisfying the following relation is written in ROMs 2003 and 2004.

$$D_y = \pm \sqrt{(k - D_x^2)} \quad \text{where } k \text{ is a constant}$$

D/A convertors 2005 and 2006 convert this magnetic field direction setting data into an analog voltage, and control the gains of current amplifiers 209 and 210 based on this voltage. If adjusted as described above, the following relation is established.

$$\sqrt{(H_x^2 + H_y^2)} = \text{const}$$

where $H_x$ is the magnetic field intensity of X-axis direction correction coil 207 and $H_y$ is the magnetic field intensity of Y-axis direction correction coil 208. Therefore, the direction of the correction magnetic field can be controlled while the magnetic field intensity of the correction magnetic field generated by the correction coil pair of X-axis direction correction coil 207 and y-axis direction correction coil 208 is kept constant.

Next, CPU 2001 generates the adjustment data for adjusting the field intensity of the magnetic field generated by the correction coil pair. This adjustment data has specific codes for the field intensity, for example, 0 through 255. D/A convertor 2007 converts these codes into analog voltages and supplies these control voltages to current amplifiers 209 and 210. Current amplifiers 209 and 210 supply currents corresponding to these control voltages to X-axis direction correction coil 207 and Y-axis direction correction coil 208. Here, because the gains of current amplifiers 209 and 210 are adjusted previously by the magnetic field direction setting data, the correction current ratio between X-axis direction correction coil 207 and Y-axis direction correction coil 208 is kept constant. Assuming that the magnetic field intensity generated by X-axis direction correction coil 207 is $H_x$, that of Y-axis direction correction coil 208 is $H_y$, and the direction of the resultant magnetic field of $H_x$ and $H_y$, namely, the correction magnetic field is θ, the following relation below is established. Therefore, the magnetic field intensity can be controlled without changing the direction of the correction magnetic field.

$$\theta = \tan^{-1}(H_y/H_x) = \text{const.}$$

In the actual landing adjustment, an optimum adjustment of the correction magnetic field is effected by controlling the intensity and direction of the correction magnetic field of the correction coil pair constituted by X-axis direction correction coil 207 and Y-axis direction correction coil 208 while watching the landing state on the display screen of a color television.

As described above, according to the third embodiment of the present invention, by independently controlling the intensity and direction of the correction magnetic field of a correction coil pair constituted by a X-axis direction correction coil and a Y-axis direction correction coil where the generated magnetic fields cross with each other at right angles, a landing correction can be realized with a simplified landing correction procedure and at a high accuracy.

Although the correction direction (resultant combined vector) and the correction intensity can be controlled arbitrarily in the third embodiment, either one may be only controlled at need.

Embodiment 4

Figure 8B:
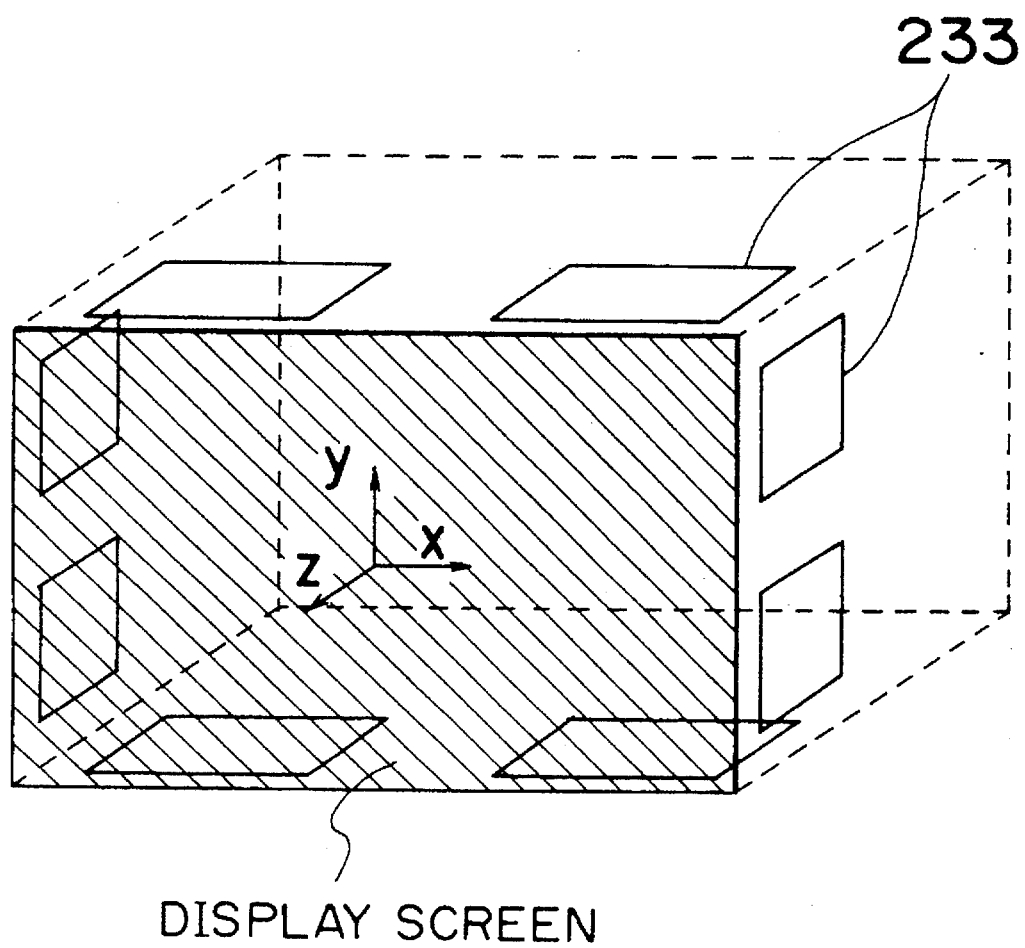
FIG. 8 (a) is a block diagram of a beam landing correction apparatus in accordance with a fourth embodiment of the present invention.
Figure 9A:
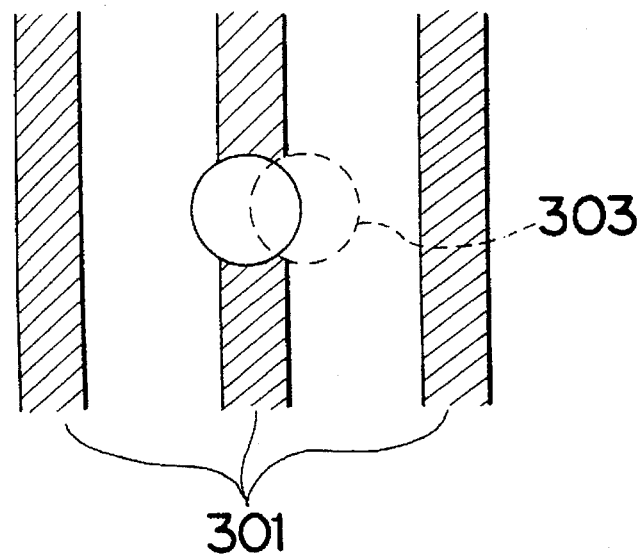
FIGS. 9 (a) and 9 (b) are explanatory views of tolerances in beam landing in different arrangements of phosphor elements.
Figure 9B:
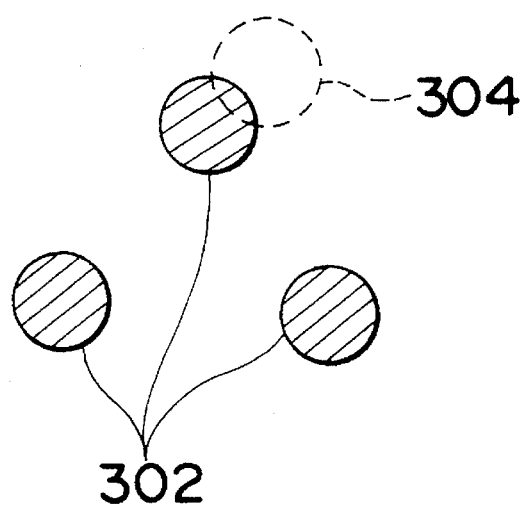
Figure 10:
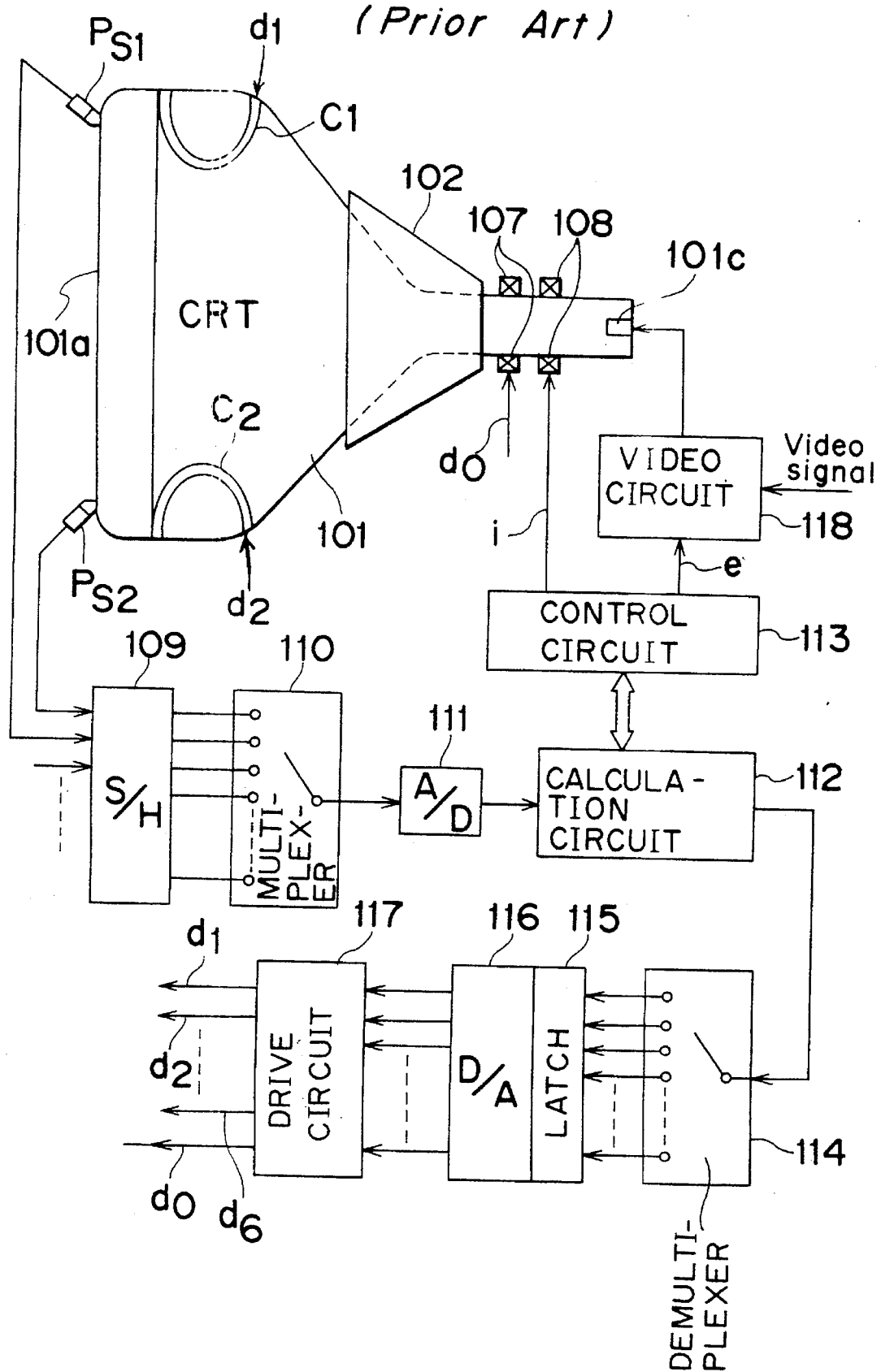
FIG. 10 is a block diagram of a conventional beam landing correction apparatus.
Figure 12A:
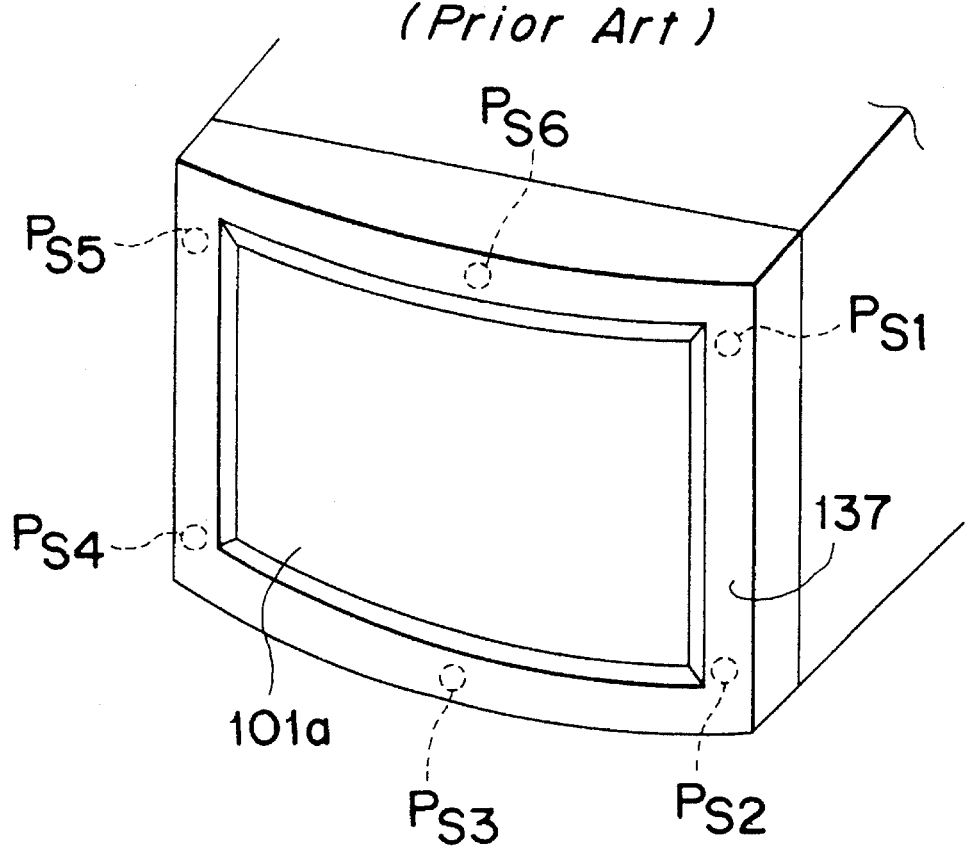
FIGS. 12 (a) and 12 (b) are schematic views showing an arrangement of photosensors in the conventional apparatus.
Figure 12B:
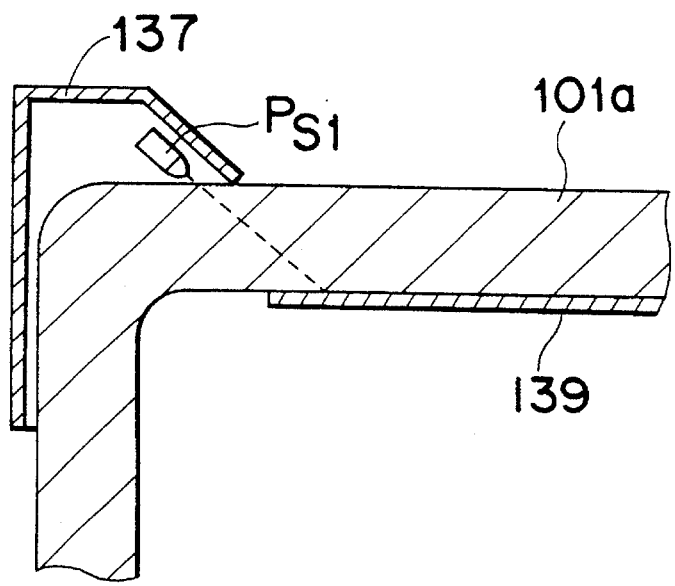
Figure 13A:
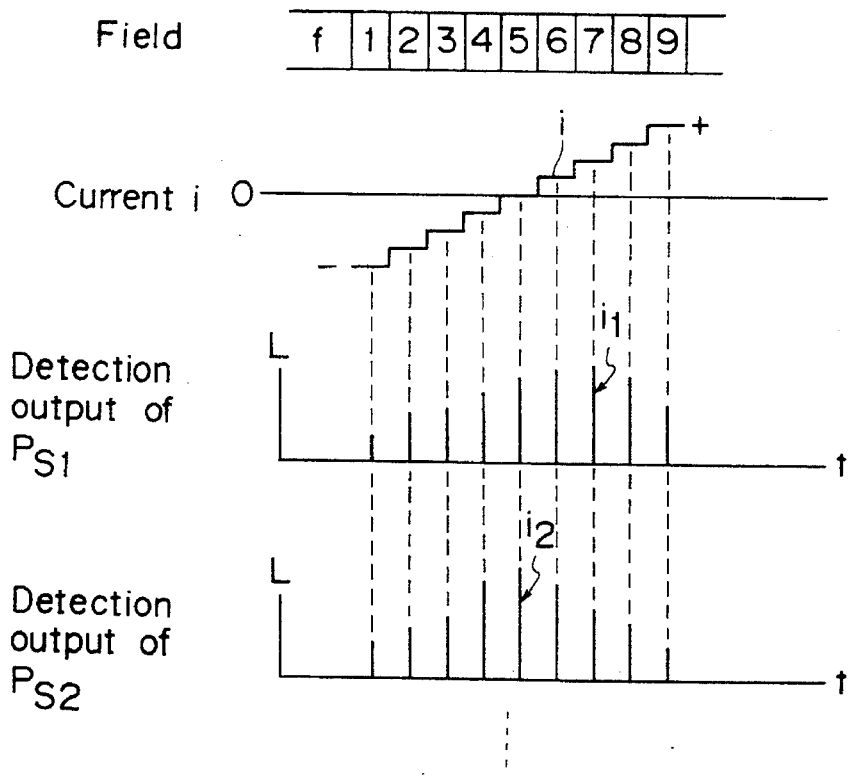
FIG. 13 (a) and 13 (b) are explanatory views of the operation of the conventional apparatus.
Figure 13B:
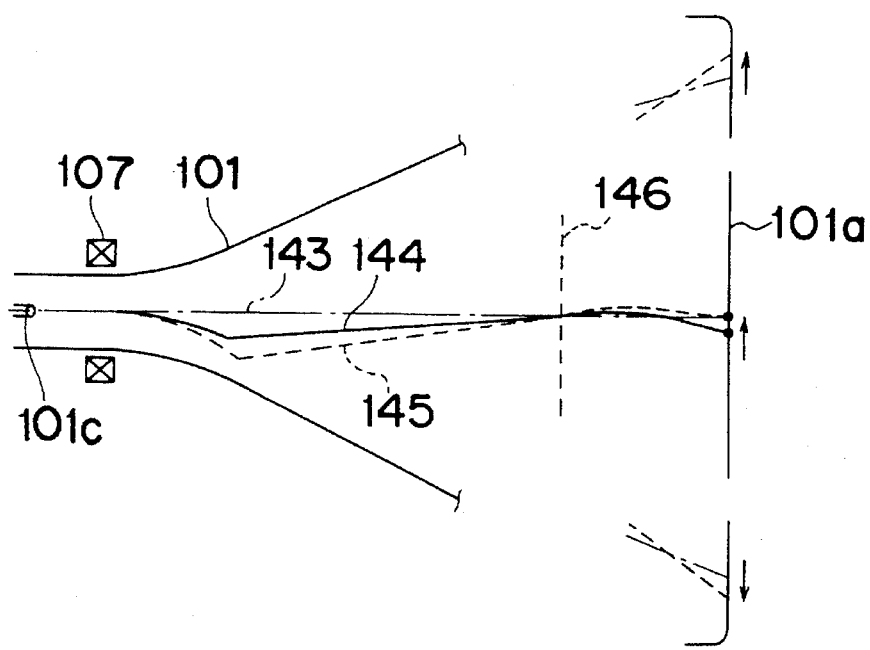

The following describes a beam landing correction apparatus in accordance with a fourth embodiment of the present invention with reference to FIGS. 8 (a) and 8 (b).

Referring to FIG. 8 (a), the present apparatus comprises a cathode ray tube (CRT) 223 for displaying a received video image on the screen of the color television receiver, a correction area designation section (CADS) 224 for designating an area to be subject to landing correction, and a test signal generating section (TSGS) 225 for generating a test signal to be displayed on the screen corresponding to the correction area data designated by the correction area designation section (CADS) 224. The apparatus further comprises a mislanding error detection section (MEDS) 226 for detecting a mislanding error based on the test signal displayed on the television receiver screen, an analog-to-digital converter section 227 for converting the analog mislanding error data into digital data, and a correction data generating section (CDGS) 228 for generating correction magnetic field data corresponding to the correction area designated by the correction area designation section (CADS) 224 depending on the A/D converted mislanding error data. The correction magnetic field data generated by the correction data generating section (CDGS) 228 is stored in a memory section 229 corresponding to the designated correction area. The correction magnetic field data is converted into an analog value through a digital-to-analog converter section 230. Reference numeral 231 denotes a drive section for driving the landing correction section 232 based on the correction data. The landing correction section includes four correction coil pairs, each constituted by a X-axis direction correction coil and a Y-axis direction correction coil where the generated magnetic fields cross with each other at right angles as in the first embodiment.

The following describes the operation of the landing correction apparatus of the fourth embodiment constructed as mentioned above.

Figure 21:
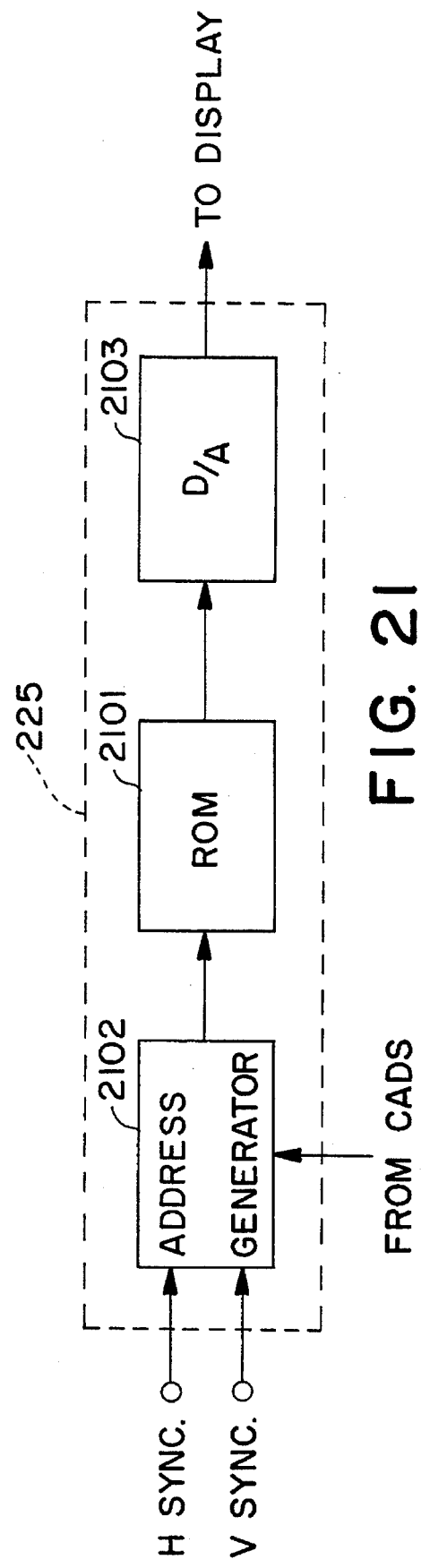
FIG. 21 is a block diagram of a test signal generating section in accordance with the fourth embodiment of the present invention.

The direction and intensity of the correction magnetic field can be independently controlled by means of the landing correction coil pair 233 as described in the third embodiment. The procedure of performing a landing adjustment operation on the display screen of the cathode ray tube 223 is as following:

Firstly, an area to be subjected to a landing correction is designated by the correction area designation section (CADS) 224. In the designation of an area to be subjected to the correction, the correction area designation section 224 generates a code corresponding to, for example, the upper right portion or the lower right portion on the CRT display screen and the test signal generating section 225 displays a white window pattern on the portion corresponding to the code. The generation of the window pattern is effected as follows. The explanation is made below with reference to FIG. 21 which is a detailed construction view of the test signal generating section. In FIG. 21, reference numeral 2101 is a ROM containing data for the window pattern, reference numeral 2102 is an address generator for generating the read-out address of ROM 2101 based on the horizontal synchronizing signal, vertical synchronizing signal and the correction area designating code output by the correction area designating section 224, and reference numeral 2103 denotes a D/A convertor for converting the output of ROM 2101 into an analog signal. The display of the window pattern on the CRT display screen is effected by determining the read-out address of the ROM from the code generated by the correction area designating section 224 and generating the pattern at a specified position of the display screen.

Next, the mislanding error detecting section 226 detects the luminance and chrominance of the white window pattern displayed on the correction area, and thus the mislanding error is detected by the same method as described in the second embodiment of the present invention.

The error data detected by the mislanding error detection section (MEDS) 226 is converted into digital data through the analog-to-digital converter section 227 to be supplied to the correction data generating section (CDGS) 228. The correction data generating section (CDGS) 228 generates magnetic field intensity data and magnetic field direction data optimum for the correction based on the supplied error data. The memory section 229 stores the optimum correction data of the magnetic field intensity and direction data which is supplied on occasion to the drive section 231 via the digital-to-analog converter section 230. Section 231 drives the landing correction section 232. The construction of the drive section 231 and the drive method for the landing correction coils 233 is the same as described in the first embodiment. Therefore, an explanation thereof is omitted. In addition, the embodiment shown in FIG. 8(a) detects beam mislanding from the CRT screen in the same manner as the embodiment shown in FIG. 4(a) using the mislanding error detection section (MEDS) 226. Therefore, an explanation thereof is omitted.

By constructing the landing correction apparatus in the manner as described above in the fourth embodiment of the present invention, a high-accuracy automatic landing correction can be performed.

Although a digital processing correction system is adopted in the fourth embodiment, the same effect can be achieved by means of an analog processing circuit.

Although the landing correction coils are arranged at peripheral portions of the cathode ray tube in the embodiments 1 to 4, it is of course effective that they are arranged in other positions.

As described above, according to the first aspect of the present invention, a correction coil pair comprised of the x-axis direction correction coil and the y-axis direction correction coil is provided at each of four peripheral corner portions of the cathode ray tube, and by virtue of the resultant combined vector of the magnetic fields of the x-axis and y-axis direction correction coils, it becomes possible to correct with high accuracy the mislanding attributed to the concentration of the geomagnetism at the peripheral portions of the cathode ray tube due to the influence of the frame and the like.

Furthermore, by adopting an arrangement where the magnetic field detection means (23) is provided for detecting the direction and magnetic field intensity of the geomagnetism at a specified position of the color television receiver, the control means controls the drive means to generate a landing correction signal according to the output from the magnetic field detection means, so that the automatical landing correction can be achieved by detecting the magnetic field intensity and direction of the geomagnetism and generating the correction signal corresponding to the detected intensity and direction data of the geomagnetic field.

According to the second aspect of the present invention, the luminance and chromaticity on the screen of the color television display is detected by the mislanding error detection section to obtain the mislanding error, so that a quantitative landing correction can be achieved in a short time with high accuracy by driving the correction coils using a correction signal corresponding to the mislanding error data.

According to the third aspect of the present invention, by successively controlling at control terminals the magnetic field direction and magnetic field intensity of the correction magnetic field formed by each correction coil, a high-accuracy landing correction can be achieved by means of an algorithmic control to thereby allow a simple and high-accuracy landing adjustment to be achieved by means of a digital control.

According to the fourth aspect of the present invention, the mislanding error detection section detects the mislanding error on the display screen of a color television receiver to supply an optimum correction data of the direction and intensity of the correction magnetic field to the landing correction coil pair comprised of the x-axis direction correction coil and the y-axis direction correction coil according to the mislanding error quantity, a high-accuracy automatic landing correction can be achieved providing a great practical effect. Any system of the present invention is very effective particularly when it is applied to a shadow mask type CRT for the high-vision system.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A beam landing correction apparatus for correcting a beam mislanding due to geomagnetism in a cathode ray tube comprising:

landing correction means including at least a plurality of coil pairs each of which is comprised of two correction coils of which magnetic field axes cross each other at right angles, the correction coil pairs arranged on the peripheral portions of the cathode ray tube;

drive means for supplying a landing correction signal to said landing correction means for correcting the beam mislanding;

control means for controlling said drive means; and a static correction coil arranged at a neck portion of the cathode ray tube.

2. The beam landing correction apparatus as claimed in claim 1, wherein said landing correction means comprises magnetic field detection means for detecting the direction and intensity of the geomagnetic field at a specified position of the cathode ray tube and said control means controls said drive means to generate a landing correction signal according to the direction and intensity of the geomagnetic field detected at said magnetic field detection means.

3. A beam landing correction apparatus as recited in claim 1, wherein the cathode ray tube has a corner area and wherein one of the plurality of coil pairs are arranged on the peripheral portions of the corner area of the cathode ray tube to correct beam mislanding in the corner area.

4. A beam landing correction apparatus as recited in claim 1, further including an electron beam having an electron beam direction and wherein the geomagnetism has a geomagnetism direction and the drive means supplies the landing correction signal to the landing correction means to make the geomagnetism direction coincide with the electron beam direction.

5. The beam landing correction apparatus of claim 1, wherein the cathode ray tube has first, second, third, and fourth corner areas and wherein the landing correction means further comprises a first coil pair for correcting beam mislanding in the first corner area, a second coil pair for correcting beam mislanding in the second corner area, a third coil pair for correcting beam mislanding in the third corner area, and a fourth coil pair for correcting beam mislanding in the fourth corner area.

6. The beam landing correction apparatus of claim 5, wherein the first, second, third, and fourth coil pairs respectively correct beam mislanding only within the first, second, third, and fourth corner areas.

7. The beam landing correction apparatus of claim 5, wherein the first, second, third, and fourth corner areas are substantially non-overlapping.

8. The beam landing correction apparatus of claim 1, wherein the cathode ray tube has first and second corner areas and wherein the landing correction means further comprises a first coil pair for correcting beam mislanding in the first corner area and a second coil pair for correcting beam mislanding in the second corner area.

9. A beam landing correction apparatus for correcting a beam mislanding due to a geomagnetism in a color television receiver for receiving video information comprising:

display means for displaying the received video information on display screen in the color television receiver;

landing correction means for correcting the beam mislanding;

drive means for supplying a landing correction signal to said landing correction means;

landing error detection means for detecting a beam mislanding quantity based on a luminance and chromaticity distribution in a two-dimensional area on the display screen of said display means;

control means for controlling said drive means according to the detected error data output from said landing error detection means.

10. The beam landing correction apparatus as claimed in claim 9, wherein said landing error detection means includes a photoelectric transfer element for detecting the luminance and chromaticity distribution on the display screen to be transferred to an electrical output data of the mislanding quantity.

11. The beam landing correction apparatus as claimed in claim 9, wherein said landing error detection means obtains the landing error attributed to the beam mislanding based on the luminance and chromaticity data with respect to specified reference values of the luminance and chromaticity and the obtained landing error data is supplied to said control means.

12. A beam landing correction apparatus for correcting a beam mislanding due to a geomagnetism in a cathode ray tube comprising:

landing correction means including at least a plurality of landing correction coil pairs each of which is comprised of two correction coils of which correction magnetic field axes cross each other at right angles;

drive means for driving said landing correction means;

correction magnetic field direction setting means for setting a magnetic field direction for the correction magnetic field to be generated by said landing correction means;

correction magnetic field intensity adjustment means for varying the intensity of the correction magnetic field without exerting any substantial influence on the correction magnetic field direction; and control means for controlling said correction magnetic field direction setting means and said correction magnetic field intensity adjustment means.

13. The beam landing correction apparatus as claimed in claim 12, wherein said control means controls said correction magnetic field direction setting means and said correction magnetic field intensity adjustment means in a sequential manner.

14. The beam landing correction apparatus of claim 12, wherein the cathode ray tube has first, second, third, and fourth corner areas and wherein the landing correction means further comprises a first coil pair for correcting beam mislanding in the first corner area, a second coil pair for correcting beam mislanding in the second corner area, a third coil pair for correcting beam mislanding in the third corner area, and a fourth coil pair for correcting beam mislanding in the fourth corner area.

15. The beam landing correction apparatus of claim 14, wherein the first, second, third and fourth coil pairs respectively correct beam mislanding only within the first, second, third, and fourth corner areas.

16. The beam landing correction apparatus of claim 14, wherein the first, second, third and fourth corner areas are substantially non-overlapping.

17. The beam landing correction apparatus of claim 12, wherein the cathode ray tube has first and second corner areas and wherein the landing correction means further comprises a first coil pair for correcting beam mislanding only within the first corner area and a second coil pair for correcting beam mislanding only within the second corner area.

18. The beam landing correction apparatus as claimed in claim 12, wherein said landing correction means further comprises a static correction coil arranged at a neck portion of the cathode ray tube.

19. A beam landing correction apparatus for correcting a beam mislanding due to a geomagnetism in a color television receiver for receiving video information comprising:

display means for displaying the received video information on a display screen in the color television receiver;

landing correction means for correcting the beam mislanding;

correction area designation means for designating an area to be subject to landing correction;

test signal generating means for displaying a test signal on the display screen of said display means according to an output of said correction area designation means;

mislanding error detection means for detecting a mislanding error in the correction area designated by said correction area designation means;

correction magnetic field data generating means for generating correction magnetic field data corresponding to the correction area designated by said correction area designation means according to a mislanding error data output from said mislanding error detection means;

memory means for storing the correction magnetic field data generated by said correction magnetic field data generating means; and drive means for driving said landing correction means according to the correction magnetic field data output from said memory means.

20. The beam landing correction apparatus as claimed in claim 19, wherein said correction magnetic field data generating means generates magnetic field direction data and magnetic field intensity data of the correction magnetic field corresponding to the quantity of the mislanding error in the area to be subject to the landing correction.

21. A beam landing correction apparatus for correcting a beam mislanding due to a geomagnetism in a cathode ray tube having at least two corner areas, said beam landing correction apparatus comprising:

landing correction means including a first coil pair and a second coil pair, each coil pair comprising two correction coils of which magnetic field axes cross each other at right angles, the first and second correction coil pairs are arranged on the peripheral portions of the cathode ray tube where the first coil pair corrects beam mislanding in only a first corner area of the corner areas and the second coil pair corrects beam mislanding in only a second corner area of the corner areas;

drive means for supplying a landing correction signal to said landing correction means for correcting the beam mislanding; and control means for controlling said drive means.

22. The beam landing correction apparatus of claim 21, wherein the landing correction means has a third coil pair for correcting beam mislanding in only a third corner area of the corner areas and a fourth coil pair for correcting beam mislanding in only a fourth corner area of the corner areas.

23. The beam landing correction apparatus of claim 21, wherein the first and second corner areas are substantially non-overlapping.

* * * * *